United States Patent [19]

Powell et al.

[11] Patent Number: 5,669,310

[45] Date of Patent: Sep. 23, 1997

[54] ELECTROMAGNETIC INDUCTION SUSPENSION AND HORIZONTAL SWITCHING SYSTEM FOR A VEHICLE ON A PLANAR GUIDEWAY

[76] Inventors: James R. Powell, P.O. Box 547, Shoreham, N.Y. 11786; Gordon T. Danby, P.O. Box 12, Wading River, N.Y. 11792; John Morena, 4540 Sandpebble Trace #104, Stuart, Fla. 34996

[21] Appl. No.: 601,083

[22] Filed: Feb. 14, 1996

Related U.S. Application Data

[63] Continuation of Ser. No. 265,044, Jun. 23, 1994, Pat. No. 5,503,083.

[51] Int. Cl.$^6$ .................................................. B61B 13/00
[52] U.S. Cl. .......................................... 104/281; 104/286
[58] Field of Search ................................. 104/281, 282, 104/286, 292, 294, 130.02

[56] References Cited

U.S. PATENT DOCUMENTS

| | | | |
|---|---|---|---|
| 3,470,828 | 10/1969 | Powell et al. | 104/281 |
| 3,828,686 | 8/1974 | Steenbeck et al. | 104/130.2 |
| 3,845,720 | 11/1974 | Bohn et al. | |
| 3,861,320 | 1/1975 | Lichtenberg | 104/130.02 |
| 3,921,535 | 11/1975 | Lichtenberg | 104/281 |
| 3,937,150 | 2/1976 | Miericke et al. | 104/281 |
| 3,952,668 | 4/1976 | Urankar | 104/281 |
| 3,994,236 | 11/1976 | Dull et al. | |
| 4,123,976 | 11/1978 | Nakamura et al. | |
| 4,259,908 | 4/1981 | Feistkorn et al. | |
| 4,280,412 | 7/1981 | Mihirogi | |
| 4,516,505 | 5/1985 | Heidelberg | |
| 4,641,586 | 2/1987 | Miller et al. | |
| 4,646,651 | 3/1987 | Yamamura et al. | |
| 4,731,569 | 3/1988 | Bohn | |
| 4,866,380 | 9/1989 | Meins et al. | |
| 4,972,779 | 11/1990 | Morishita et al. | |
| 5,067,415 | 11/1991 | Morishita et al. | |
| 5,094,173 | 3/1992 | Tada et al. | |
| 5,146,853 | 9/1992 | Suppes | |
| 5,178,072 | 1/1993 | Suzuki | |
| 5,184,557 | 2/1993 | Rossing | |
| 5,213,047 | 5/1993 | Fujiwara et al. | 104/281 |
| 5,222,436 | 6/1993 | Coffey | 104/281 |
| 5,222,437 | 6/1993 | Shibata et al. | 104/282 |
| 5,253,591 | 10/1993 | Rote et al. | 104/281 |

FOREIGN PATENT DOCUMENTS 2610538  9/1977  Germany .................................. 104/281

*Primary Examiner*—Mark T. Le
*Attorney, Agent, or Firm*—Fulwider Patton Lee & Utecht, LLP

[57] ABSTRACT

The electromagnetic induction suspension and horizontal switching system for a vehicle on a substantially planar guideway provides vertical lift and stability and lateral stability for a vehicle. The system provides inherent vertical lift, as well as vertical and lateral stability, including pitch, yaw and roll stability. Moreover, the suspension and stabilization system of the present invention allows electronic, horizontal switching between multiple substantially planar guideways such as a mainline guideway and a secondary guideway, which may be accomplished at speeds over 300 m.p.h. Proximal to and within a switching area at the intersection of the mainline guideway and the secondary guideway, the respective lift and stability systems for each guideway coexist and may be switched on or off, depending on the path chosen for the vehicle.

21 Claims, 13 Drawing Sheets

ELECTROMAGNETIC INDUCTION SUSPENSION AND HORIZONTAL SWITCHING SYSTEM FOR A VEHICLE ON A PLANAR GUIDEWAY

This is a continuation of application Ser. No. 08/265,044, filed Jun. 23, 1994 now U.S. Pat. No. 5,503,083.

BACKGROUND OF THE INVENTION

1. Field of the Invention

This invention relates generally to electromagnetic induction suspension, propulsion, and stabilization systems for ground vehicles, and more particularly concerns an electromagnetic induction suspension and propulsion system for a vehicle utilizing superconducting magnets for electromagnetic levitation of the vehicle over a substantially planar guideway. Electromagnetic levitation involving induction by magnets on a moving vehicle interacting with passive conducting guideway elements is also referred to herein as electrodynamic levitation.

2. Description of Related Art

With an increasing need for transportation systems that can minimize environmental and noise pollution, that are more energy efficient, and that can reduce traffic congestion and improve travel safety, and with new advances in materials and technology, interest in passenger and freight vehicles suspended by magnetic levitation has also grown. Such systems have been proven in pilot projects to be able to achieve speeds of over 300 miles per hour.

Conventional wheeled systems have the disadvantage that vehicle speed is limited owing to the frictional interplay and mechanical stresses between the vehicle and the track system and within the wheel assemblies of the vehicle. Transfer of power from the track to the vehicle also becomes a limitation, and at high speeds, conventional wheeled ground vehicles become highly inefficient and subject to excessive dynamic mechanical stresses.

Vehicles suspended through magnetic levitation can have much reduced friction losses and mechanical vibration problems due to guideway irregularities because they do not contact the guideway.

Passenger transport systems based upon electromagnets have utilized magnetic attraction forces to suspend moving vehicles. However, magnetic attractive forces inherently result in a very unstable levitation of the vehicle above the guideway. To prevent crashes, it is necessary with such systems to maintain the distance between the vehicle and the guideway through feedback from a gap sensor. This sensor then controls electronic power supplied to rapidly adjust magnet current to constantly maintain the gap. Typical electromagnetic attractive systems commonly produce heavy vehicles with small clearances between the vehicle and the guideway. Such systems are known to rely on vehicle/guideway interfaces in which the vehicle mechanically captures the guideway. In fact, these magnetic levitation system designs require that the vehicle capture the guideway in order to develop vehicle lift upwards toward a ferromagnetic rail. Vertical stability and lateral stability require control currents for both vertical and horizontal directions. The need to capture the guideway has been assumed to be an acceptable safety measure to ensure that a high speed vehicle will remain safely on the guideway in the event of a malfunction resulting in a loss of levitation or control.

The opportunity to switch a vehicle between guideways in these systems, in order to change guideways or to move off-line to a passenger or light freight transfer platform, has been limited because the complex vehicle/guideway magnet interface served to mechanically capture the vehicle magnets. As a result, switching the path of a vehicle from one guideway to another required mechanically switching long sections of the guideway over a period of many seconds. Safety and secondary suspension systems have also served to prevent rapid switching of a vehicle from one guideway to another. In addition, mechanical guideway switching has required the vehicle to slow down far below its normal speed of 300 m.p.h., as well as elaborate and complex interlocks to ensure that the proper mechanical interfaces had been satisfied for safe switching.

Designs in which the guideway captures the vehicle between vertical walls limit the methods whereby the vehicle may be switched from a primary guideway onto a secondary guideway. One such system employs electrodynamic repulsive force when switching from a primary guideway to a secondary guideway at guideway-branch locations. This guideway system mechanically raises and lowers a guideway element to develop the repulsive force necessary to assist in switching between guideways. This is analogous to conventional rail cars relying on mechanically changing tracks to redirect the rail car onto a new track, however, in the vertical plane.

Another approach to switching has been proposed for switching a small-capacity magnetic levitation system which also employs electrodynamic force. In this system the weight of the vehicle is supported by the interaction between pairs of outrigger paddles extending horizontally from each side of the vehicle and wall-mounted rails. The design of the vehicle/guideway interface necessitates that the vehicle change its course by selecting a rail of a different vertical height along the wall at a switching junction. The vehicle then rises or falls vertically on the selected rail until clear of the switching junction and the non-selected rail.

It would be desirable to provide for an electromagnetic induction suspension and stabilization system which takes advantage of the electrodynamical forces between vehicle magnets and guideway to operate on a substantially planar guideway. It would also be desirable to provide a system which allowed electronic horizontal switching between guideways at high speed. A vehicle operating on a substantially planar guideway may therefore be horizontally switched from one guideway to another at high speed. In addition, switching between substantially planar guideways allows horizontal switching without cumbersome, and potentially hazardous, mechanical switching of guideway elements or vertical displacement of the vehicle. The present invention meets these needs.

SUMMARY OF THE INVENTION

Briefly, and in general terms, the present invention is an electromagnetic induction suspension, propulsion and stabilization system for moving a vehicle having superconducting magnets for dynamically providing electromagnetic levitation along a substantially planar guideway that provides inherent vertical and lateral stability, including pitch, yaw and roll stability. Moreover, the suspension and stabilization system of the present invention allows electronic, horizontal switching between guideways, which may be accomplished at full speed, without the need for complex and unreliable mechanical switching.

Accordingly, the present invention provides for an electromagnetic induction suspension and stabilization system for a vehicle having a plurality of superconducting magnets and a substantially planar guideway. The guideway has two laterally extended sides which are defined by a longitudinally extending series of lift and stability means for providing vertical lift and stability and lateral stability to the vehicle, and includes propulsion means. The vehicle superconducting magnets, lift and stability means, and propulsion means are arranged in an electromagnetic inductive relationship to each other, whereby, when the vehicle is propelled at speeds above a certain transition speed, a repulsive force is generated between the vehicle and the lift and stability means sufficient to suspend and stabilize the vehicle above the substantially planar guideway and to propel it stably along the guideway.

The vertical lift means comprises at least three major alternatives distinguished by location and geometry of magnetic induction loops. These alternatives provide different results directed towards providing vertical lift and stability on a substantially planar guideway. Each of these alternatives has the advantage that they can develop the necessary vertical lift and stability even though the required magnetic induction loops are located below the vehicle superconducting magnets.

The first alternative is a preferred embodiment in which the vertical lift means comprises a plurality of first and second pairs of passive magnetic induction coils, arranged preferably as electrically independent first and second pairs of null flux loop circuits, mounted on first and second sides of the substantially planar guideway, respectively. Each successive pair of first and second null flux loop circuits is mechanically and electrically independent and extends longitudinally to create a first and second magnetically induced path along the planar guideway.

In the first alternative, the preferred embodiment of first and second pairs of null flux loop circuits has a variety of optional geometries to provide vertical lift and stability. The preferred embodiment is the first option. In the first option, the null flux loop circuits comprise parallel top and bottom horizontal loops, electrically connected in series and wound in opposite directions. The top loop contains fewer turns of wire than the bottom loop and is superimposed over the bottom loop, whereby when the vehicle superconducting magnets are in proximity to the first and second pairs of null flux loop circuits the upwards magnetic force of the first and second null flux loop circuits equals the weight of the vehicle so as to maintain the vehicle superconducting magnets at an equilibrium level above the planar guideway.

Alternatively, the bottom loop comprises a FIG. 8 loop consisting of two tandem loops, loop A and loop B. Employing a FIG. 8 bottom loop has the advantage of reducing the amount of current in the circuit as compared to the first option. These two loops are wound in opposite directions, horizontally configured in a common plane and bisected by the vehicle's magnetically induced path over the planar guideway. In this configuration the FIG. 8 bottom loop preferably does not magnetically couple with the vehicle superconducting magnets.

Several embodiments can also use the second option's horizontally configured, FIG. 8, bottom loops to produce controlled net magnetic coupling between the bottom loops and the vehicle superconducting magnets. These embodiments can serve to cancel some of the magnetic flux in the top loop, thus reducing the number of turns required in the bottom loop. One embodiment requires loop A and loop B to have a different number of turns of wire with respect to each other. Alternatively, magnetic coupling may be created between the bottom loops and the vehicle superconducting magnet by designing loop A and loop B with different lateral widths with respect to each other. In yet a third embodiment, magnetic coupling may be created by aligning loop A and loop B parallel with each other but horizontally displaced with respect to each other.

In a third option, which is another embodiment of the first alternative to providing vertical lift and stability, the two bottom loops can also be aligned vertically, perpendicular to the plane created by the top loop. In this embodiment loops A and B are parallel and laterally displaced, thereby providing no magnetic coupling to the vehicle superconducting magnet at equilibrium.

Several embodiments can also use the third option's vertically configured bottom FIG. 8 loops to produce controlled net magnetic coupling between the two bottom loops and the vehicle superconducting magnets. These embodiments can serve to cancel some of the magnetic flux in the top loop, thus reducing the number of turns required in the bottom loop. One embodiment requires loop A and loop B to have dissimilar vertical heights with respect to each other. Alternatively, loop A and loop B may be vertically displaced with respect to each other. In yet a third embodiment, magnetic coupling may be created by configuring loop A and loop B with similar dimensions, but with one of the two loops perpendicular to the plane described by the top loop and the other offset such that it forms an angle other than 90 degrees to the top loop.

In a second preferred embodiment, vertical lift and stability is provided by first and second passive magnetic induction coils mounted within the respective first and second sides of the substantially planar guideway. This approach does not employ null flux loops. The first and second passive magnetic induction coils are electronically or mechanically each coupled to an external inductance in series, and are physically separate and discrete with respect to each other. The series inductance serves to limit the current induced to produce the desired lift force.

In another alternate embodiment, vertical lift and stability means comprises first and second conductive metal strips mounted within the first and second sides of the substantially planar guideway, respectively. The first and second conductive metal strips are physically separate and discrete with respect to each other.

Lateral stability means for providing lateral stability to the vehicle is provided by a plurality of first and second passive magnetic induction lateral stability coils mounted on respective first and second sides of the planar guideway. The lateral stability coils are arranged such that when the vehicle superconducting magnets are not spaced laterally equidistant from the first and second sides of the planar guideway, the vehicle superconducting magnets force the vehicle to center itself over the first and second lateral stability coils.

The first and second lateral stability coils preferably comprise a FIG. 8 null flux loop circuit consisting of two tandem loops, loop A and loop B, where loop A and loop B are wound in opposite directions, horizontally configured in a common plane and bisected by the first and second magnetically induced paths along the planar guideway. The first and second lateral stability coils are also laterally centered on the vertical lift means to provide further stability.

The present invention further provides for horizontal switching between two substantially planar guideways such as a mainline guideway, which represents the normal flow of traffic and has a means for providing lift and stability, and a secondary guideway, which represents an alternate route and also has a means for providing lift and stability. Both the mainline guideway and the secondary guideway employ substantially similar lift and stability means as described for the substantially planar guideway. Within the switching area between the mainline and secondary guideways however, the lift and stability means for both guideways are proximate to one another. To augment stability while switching, the lift and stability means within the switching area may also include a series of closely spaced loops such as aluminum strips.

Proximal to and within the intersection of the mainline guideway and the secondary guideway, the respective lift and stability means for each guideway coexist and may be switched on or off, depending on the guideway chosen for the vehicle. If the vehicle is changing guideways, for example, the vehicle progresses along the mainline guideway and enters the junction between two guideways. As the mainline lift and stability means is switched off and the secondary lift and stability means is switched on, the interaction between the vehicle superconducting magnets and the secondary lift and stability means maintains vehicle height and forces the vehicle to move laterally to remain centered over the secondary guideway. The opposite is true if the mainline guideway lift and stability means is switched on and the secondary lift and stability means is switched off. As the mainline lift and stability means and the secondary lift and stability means gradually separates into two distinct guideways, the requirement for switching is eliminated.

These and other aspects and advantages of the invention will become apparent from the following detailed description, and the accompanying drawings, which illustrate by way of example the features of the invention.

DETAILED DESCRIPTION OF THE PREFERRED EMBODIMENTS

Passenger transport systems using normal permanent magnets or electromagnets have utilized magnetic attraction or repulsion, with the vehicle and the guideway being maintained at a set distance from each other. Many such systems are known to rely on vehicle/guideway geometries in which the vehicle mechanically captures the guideway. In these systems the vehicle magnets surround the guideway on one, two or three sides to develop Vehicle lift, vertical stability and lateral stability. These systems also rely on capturing the guideway to ensure the vehicle will remain safely on the guideway in the event of a malfunction. Because of the reliance on mechanically capturing the guideway, these systems have limited opportunity to switch a vehicle between guideways, in order to change guideways or move off-line to a passenger transfer platform. In general, in these systems, vehicles are switched from one guideway to another by mechanically moving the guideway prior to passage of the vehicle.

Figure 1:
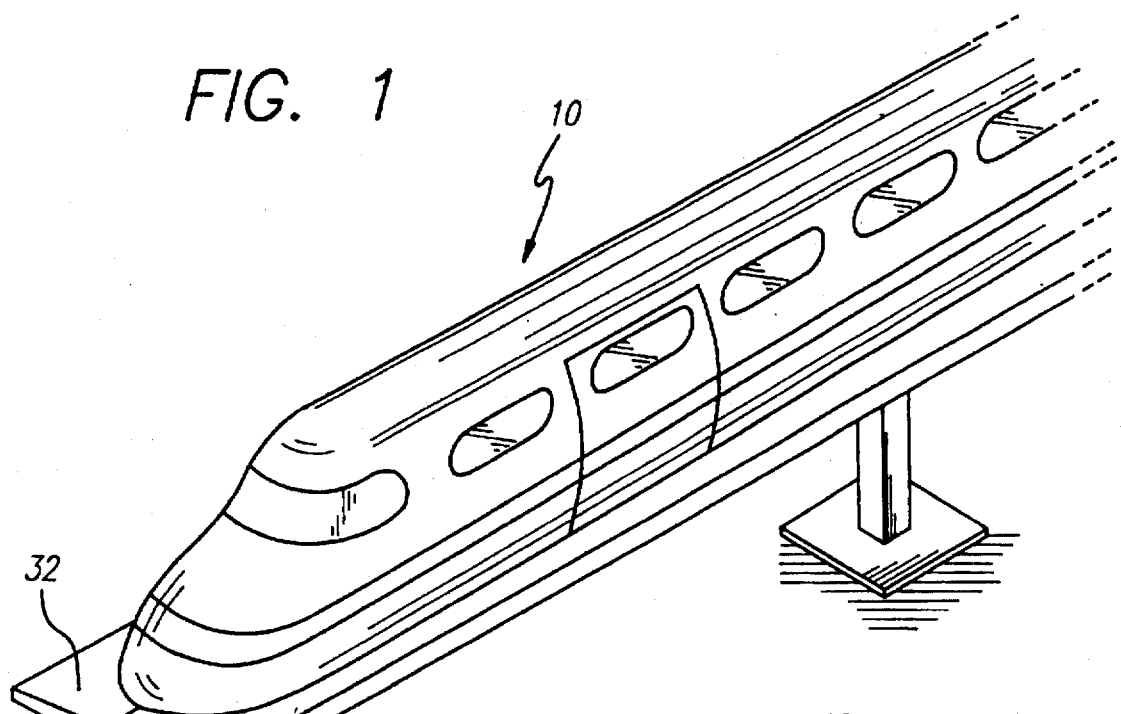
FIG. 1 is a perspective view of a ground vehicle on an electromagnetic induction suspension guideway according to the principles of the invention.
Figure 2:
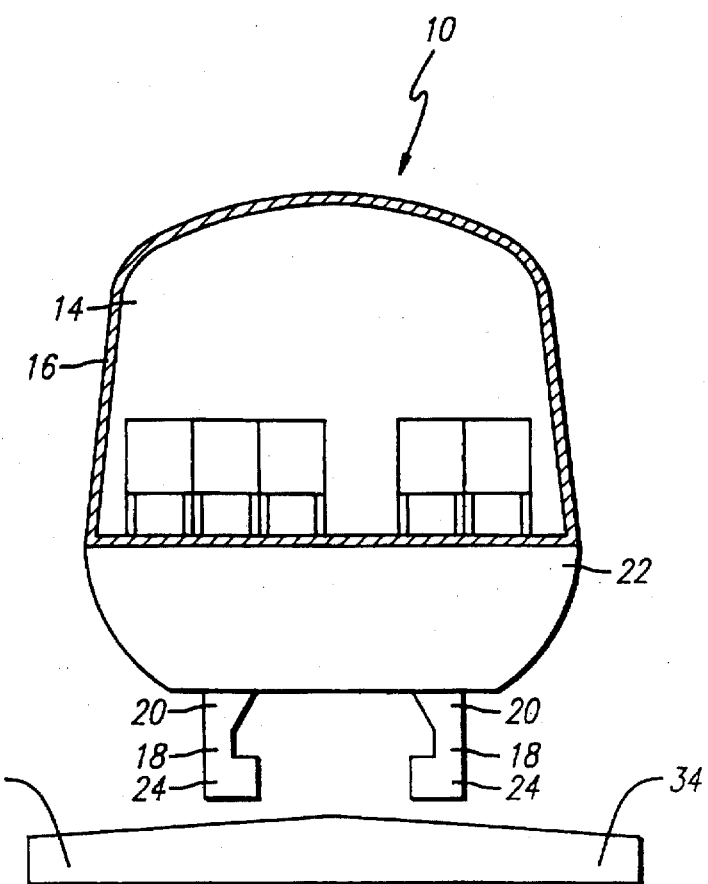
FIG. 2 is an enlarged partial sectional view of the vehicle and guideway of FIG. 1.

As is shown in the drawings for purposes of illustration, and with particular reference to FIGS. 1 and 2, the invention is embodied in an electromagnetic induction suspension and stabilization system for a ground vehicle 10, such as a car of a train, which can be, for example, approximately 100 feet long, weighing approximately 38 tons, and capable of carrying about a hundred passengers or freight loads of up to about 100,000 pounds at speeds of up to 300 miles per hour or greater.

Figure 3:
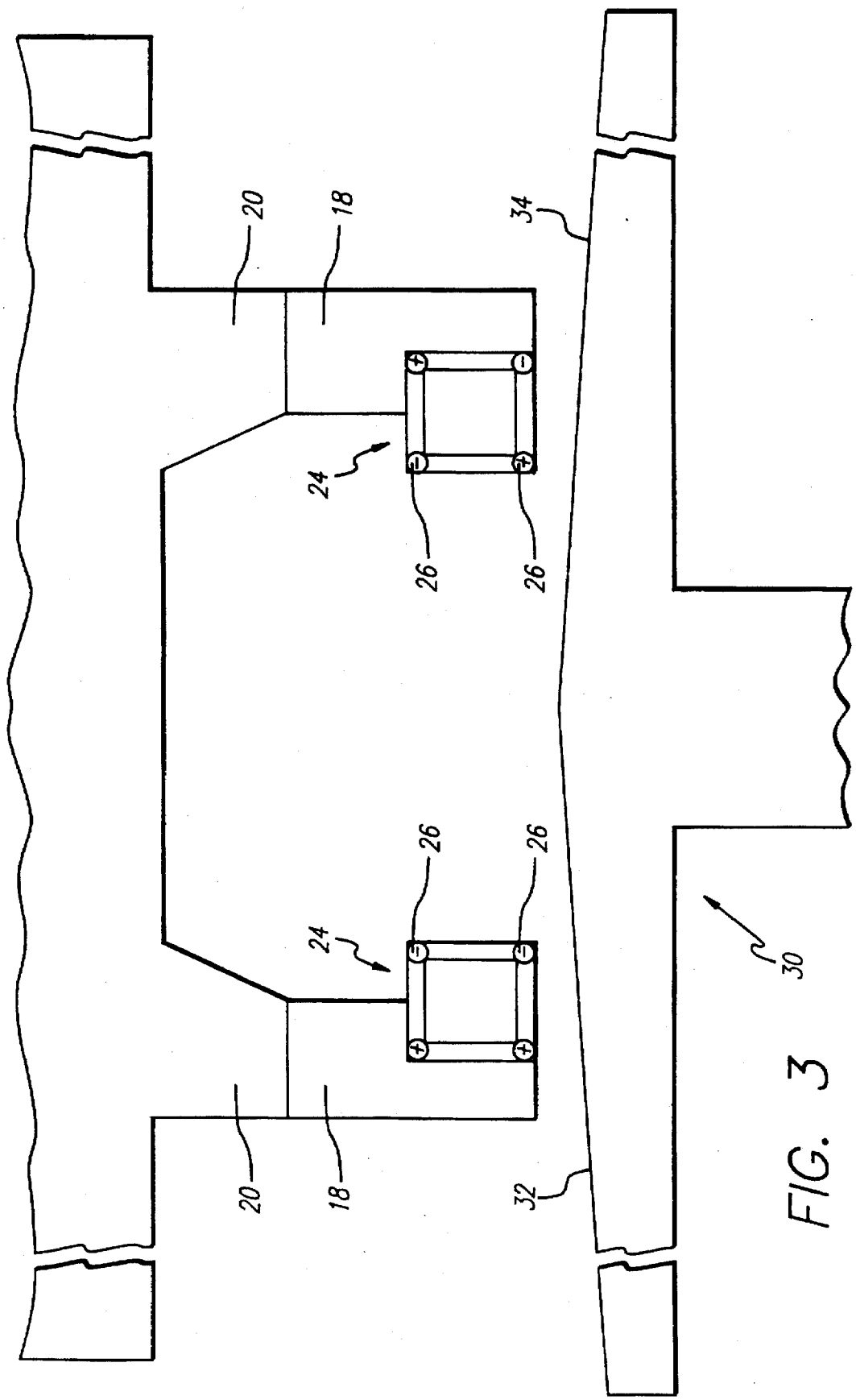
FIG. 3 is a further detailed, enlarged sectional view of the vehicle and guideway of FIG. 1, illustrating the quadrupole superconducting vehicle magnets.

As is illustrated in FIG. 2, the vehicle has a passenger or freight compartment 14 surrounded by a primary layer of magnetic shielding 16 that limits the magnetic field strength in the compartment to less than or equal to approximately one gauss, the strength of the normal ambient magnetic field strength. Referring to FIGS. 2 and 3, superconducting magnet support struts 18 are mounted underneath the vehicle to a secondary suspension or undercarriage 20 of the vehicle, providing mechanical and electromagnetic damping to minimize vibration in the passenger compartment. The undercarriage and superconducting magnet support struts are illustrated here for convenience of illustration as extending well below the body of the vehicle, although the undercarriage and struts could also be largely concealed in a lower compartment area 22. The superconducting magnet support struts can be cooled to low temperatures, such as by liquid helium or liquid nitrogen, or can be allowed to remain at roughly ambient temperature. The superconducting magnet support struts can be metallic or formed of a polymer composite material, such as a high strength fiber-reinforced materials such as polyester and glass fibers, or other similar composite materials well known in the art. Other resin systems commonly used in such fiber-reinforced materials include other thermosetting plastics such as epoxy, phenolic, and polyimide for example. Other fibers commonly used in such fiber-reinforced material include aramid fibers and carbon fibers, for example. The superconducting magnet support struts carry a superconducting magnet cryostat (not shown), typically a cryogenic container and vacuum vessel maintained typically at 5° Kelvin or less, at which temperature the current can be sustained due to superconductivity. Alternatively, higher temperature superconducting materials may also be suitable in forming the superconducting magnets. The superconducting magnet support struts thus preferably have a low thermal conductivity to provide for a low leakage of heat into the superconducting magnet cryostat. Each cryostat contains at least one superconducting magnet, and preferably contains a pair of superconducting magnets. A source of coolant, such as a reservoir of liquid helium, and a refrigeration unit (not shown), for cooling the cryostat, can be contained in the lower compartment area, for example, and for storage of effluent gas.

As is illustrated in FIG. 3, the vehicle preferably carries a plurality of superconducting quadrupole magnets 24, mounted in the cryostats carried by the vehicle. The superconducting quadrupole magnets each have four identical race track coils of superconducting cable 26, arranged in a square configuration, with each superconducting magnet coil being typically 16 inches wide by 36 inches long. The superconducting magnets each have a hollow core block with a central pipe, and are insulated by a layer of insulation in vacuum-tight inner and outer sealing jackets. The current maintained in each coil is typically 300 kAT (kilo ampere turns), although alternatively, the superconducting quadrupole magnets can be formed from two parallel coils (not shown), with typically double the amount of current, i.e. 600 kAT. The superconducting magnets are mounted sequentially underneath the vehicle in two rows. The magnetic polarity of the quadrupole magnets alternates sequentially, and the quadrupole magnets are spaced along each row with a predetermined pitch. The pitch is defined herein as the distance between the centers of two neighboring loops having the same polarity, i.e. the distance between the centers of two loops of the same polarity separated by one loop having a different polarity. A pair of quadrupole magnets of opposite polarity are preferably placed in each cryostat, though alternatively each quadrupole magnet can have an individual cryostat, or there can be three or more quadrupole magnets per cryostat. Additional shorted rings of high purity aluminum can also be placed in the cryostats in parallel magnetically with the superconducting coils of the quadrupole magnets to provide a long decay time if superconducting coils should go normal. Current in the coils of the quadrupole magnets is preferably induced initially by connecting the coils to an external power supply through a superconducting switch internal to the coils of the cryostat, or alternatively, current can be induced in the coils by connecting them with removable current leads to such a power supply, or by trapping a magnetic field when the magnets are supercooled.

Figure 4:
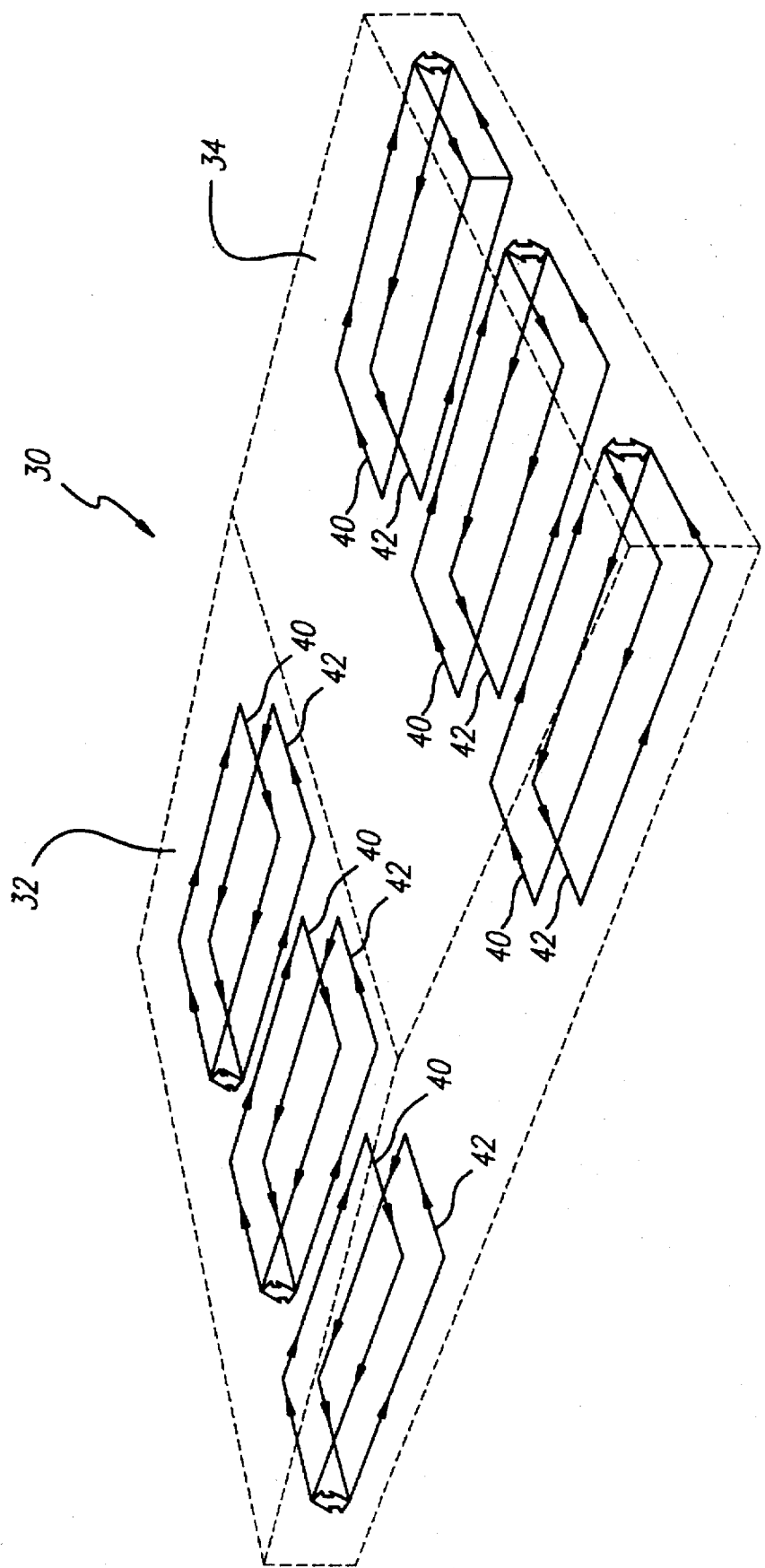
FIGS. 4–14 are sectional perspective schematic views of alternate vertical lift and stability loop arrangements for the substantially planar guideway.

As shown in FIG. 4, a substantially planar guideway 30 serves as the roadbed for the vehicle. The substantially planar guideway has laterally extended first side 32 and second side 34 which are formed by a longitudinally extending series of lift and stability means for providing vertical lift and stability and lateral stability. The lift and stability means are located beneath the vehicle, mounted within the substantially planar guideway. The vehicle superconducting magnets and the lift and stability means are arranged in an electromagnetic inductive relationship to each other, whereby, when the vehicle is propelled at speeds above a certain transition speed, a repulsive force is generated between the vehicle and the lift and stability means sufficient to suspend and stabilize the vehicle above the substantially planar guideway. The vehicle is typically suspended approximately six to eight inches over the substantially planar guideway by the suspension and stabilization system.

There are three major embodiments, distinguished by location and geometry of magnetic induction loops, for providing vertical lift and stability to a vehicle on a substantially planar guideway.

The first alternative is a preferred embodiment which is shown in the FIG. 4. In the first alternative the vertical lift means comprises a plurality of first and second pairs of passive magnetic induction coils, arranged preferably as electrically independent first and second pairs of null flux loop circuits, mounted on first and second sides of the substantially planar guideway, respectively. The magnetic induction coils are formed of insulated stranded conducting wire, preferably aluminum for economy, to minimize the generation of eddy currents. Each successive pair of first and second null flux loop circuits is mechanically and electrically independent and extend longitudinally to create a first and second magnetically induced path along the planar guideway.

In the first alternative, the preferred embodiment of first and second pairs of null flux loop circuits has a variety of optional geometries to provide vertical lift and stability. The preferred embodiment is the first option. In the first option, as shown in FIG. 4, the null flux loop circuits comprise parallel top 40 and bottom 42 horizontal loops, electrically connected in series, wound in opposite directions and as viewed from above, the top loop is superimposed over the bottom loop.

As the vehicle superconducting magnets travel over the first and second pairs of null flux loop circuits, the upwards magnetic force of the loop circuits equals the weight of the vehicle so as to maintain the vehicle superconducting magnets at an equilibrium level above the planar guideway. The number of turns in the bottom loop is greater than the number of turns in the top loop so that the net flux through a given circuit is zero at some height $H_o$ above the planar guideway surface. As the vehicle height H decreases so that $H<H_o$, a net flux develops in the circuit and a current flows, so as to push the vehicle upward. As the vehicle height increases so that $H>H_o$, a net flux of opposite sign develops in the circuit, and an oppositely directed current flows so as to pull the vehicle downwards towards the planar guideway.

At equilibrium, the vehicle has a height H' above the planar guideway that is somewhat less than $H_o$ (H'=$H_o$-delta H) such that the upwards magnetic force of the loop circuits equals the weight of the vehicle. The height H' then acts like the effective suspended height and the net force (magnetic plus gravity) always acts to return the vehicle to the H' height.

Figure 5:
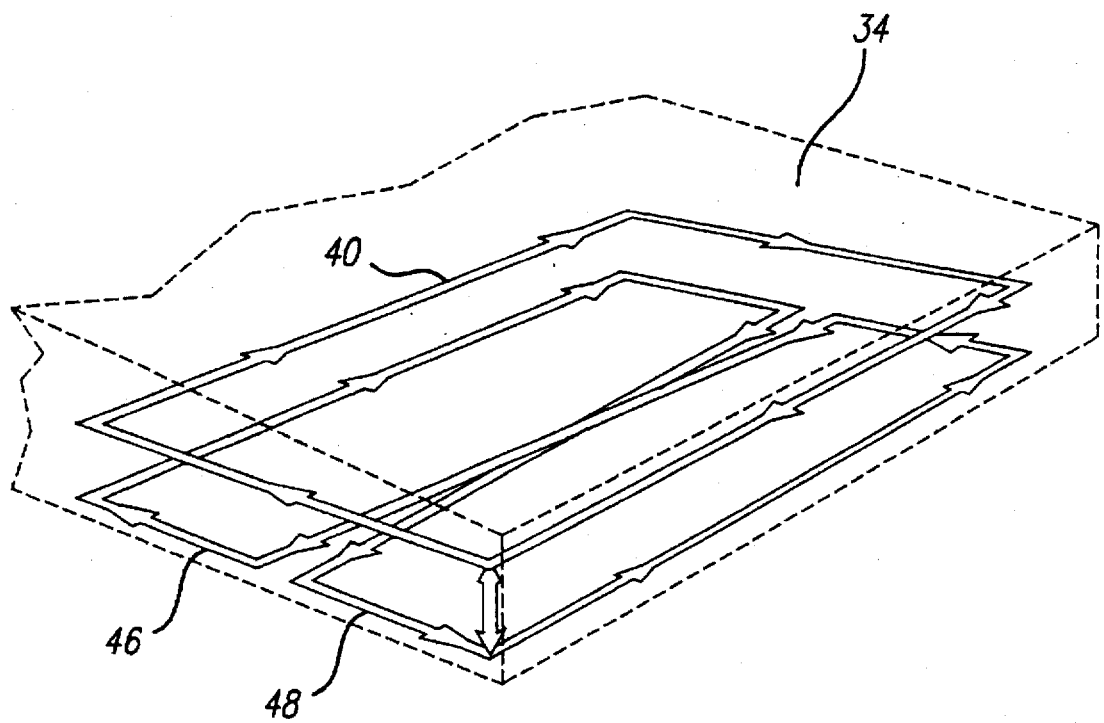
Figure 8:
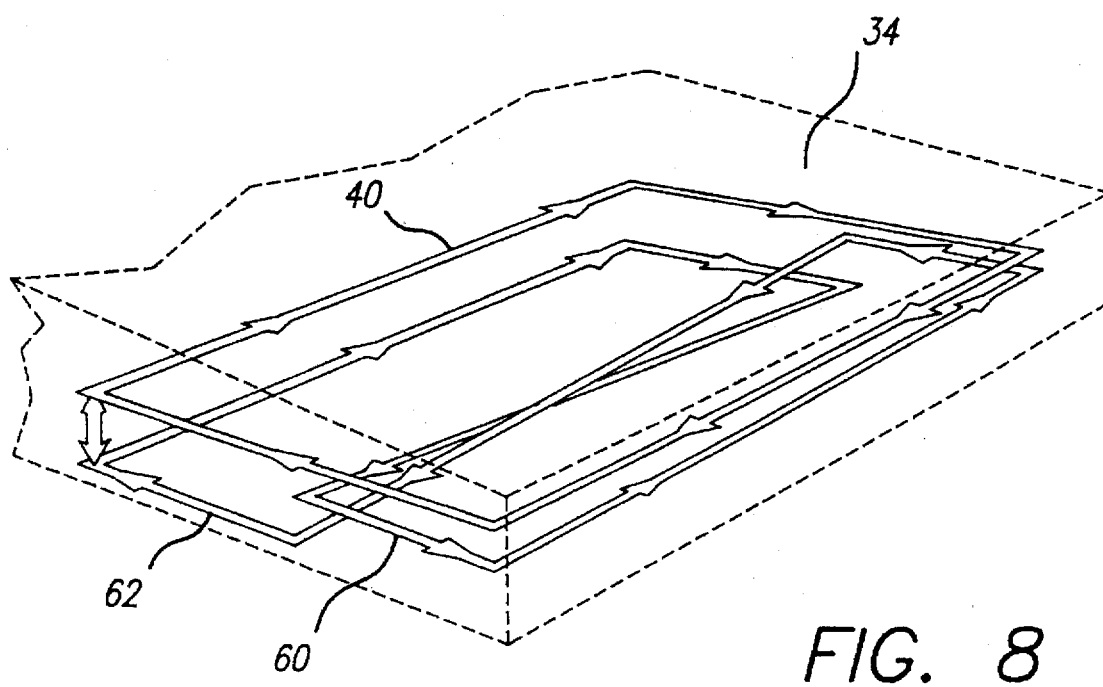

Alternatively, as shown in FIG. 5, the bottom loop comprises a substantially horizontal FIG. 8 loop consisting of two tandem loops, loop A 46 and loop B 48. Loops A and B are connected in series, with the windings of each loop in the opposite direction of the coupled loop, horizontally configured in a common plane and bisected by the vehicle's magnetically induced path over the planar guideway. The bottom FIG. 8 loop preferably does not magnetically couple to either the superconducting quadrupole magnet on the vehicle or the top loop. It provides additional self inductance in the circuit.

The self inductance of the top loop increases according to the factor $(N_T)^2$, where $N_T$ is the number of turns in the top loop. The self inductance of the bottom loop increases according to the factor $(N_B)^2$, where $N_B$ is the number of turns in the bottom loop. Therefore, for a relatively modest turns ratio, e.g., $N_B=4N_T$, the inductance of the combined top and bottom loop circuit will be on the order of 16 times the inductance of the top loop alone. The bottom FIG. 8 loop has the result of reducing the current in the circuit by a corresponding factor of roughly 16 compared to that if just the top loop were present. This embodiment has the advantage that the current in the bottom loop does not act to reduce magnetic lift.

Figure 6:
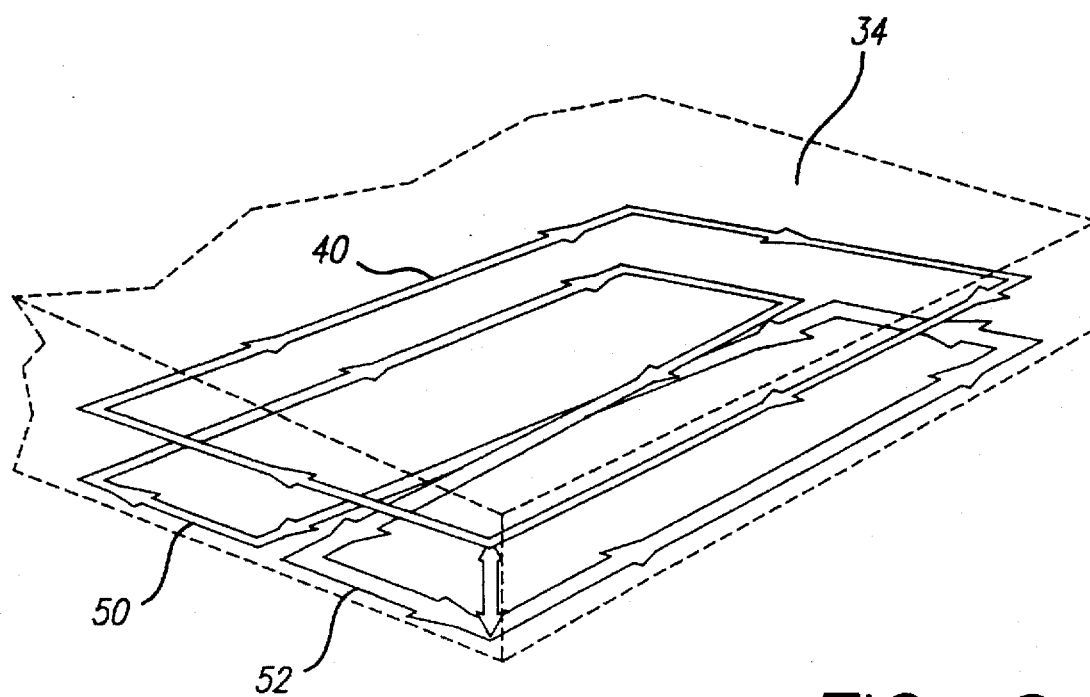
Figure 7:
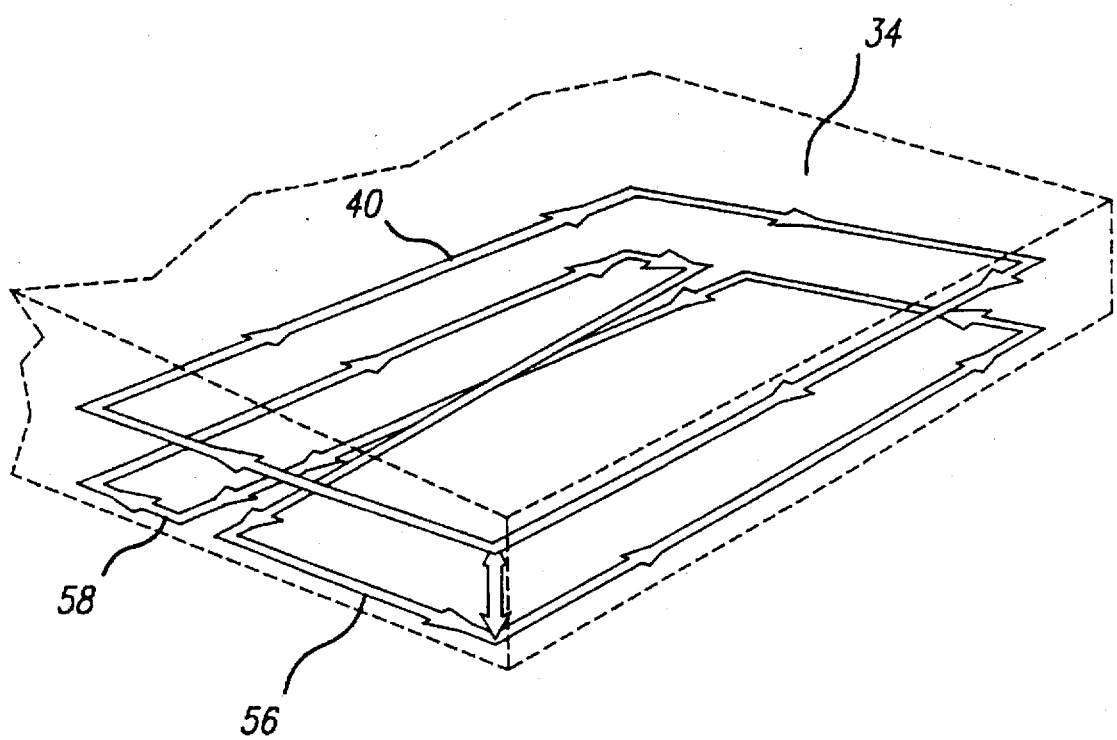

As shown in FIGS. 6–8, several embodiments can also use the second option's horizontally configured bottom FIG. 8 loops to produce controlled net magnetic coupling between the bottom loops and the vehicle superconducting magnets. These embodiments can serve to cancel some of the magnetic flux in the top loop, thus reducing the number of turns required in the bottom loop. FIG. 6 shows one embodiment which requires one side of the FIG. 8 loop 52 to have more turns of wire compared to the other side of the FIG. 8 loop 50. Alternatively, FIG. 7 shows that this offset may be achieved in another configuration if one side of the FIG. 8 loop 56 has a different lateral width than the other side 58. In a third embodiment, FIG. 8 shows this same result may be achieved by aligning loop A 60 and loop B 62 parallel with each other but vertically displaced with respect to each other. Each of these approaches may be used to create a small controlled net magnetic coupling between the bottom loop and the superconducting quadrupole magnet in order to cancel some of the magnetic flux in the top loop, thus reducing the number of turns required in the bottom loop.

Figure 9:
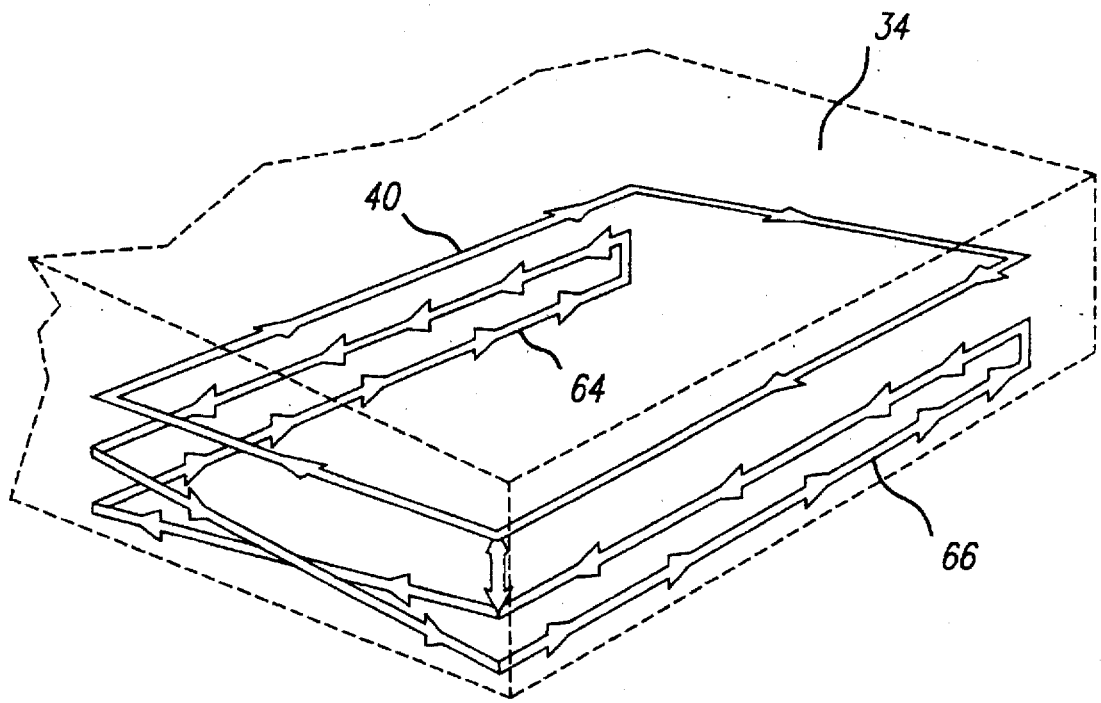

In a third option, which is another embodiment of the first alternative to providing vertical lift and stability, the two bottom loops can also be aligned vertically, perpendicular to the plane created by the top loop. In this embodiment, as shown in FIG. 9, the top loop is electrically connected to a bottom pair of loops, loop A 64 and loop B 66, to form a complete circuit which serves to add additional self inductance and reduce the required current that flows in the loops. Unlike the second option, in this configuration loops A and B are substantially vertical, perpendicular to the top loop, and parallel to one another. Preferably, the net magnetic lift force oh the vehicle from the current in the bottom pair of loops is zero.

Figure 10:
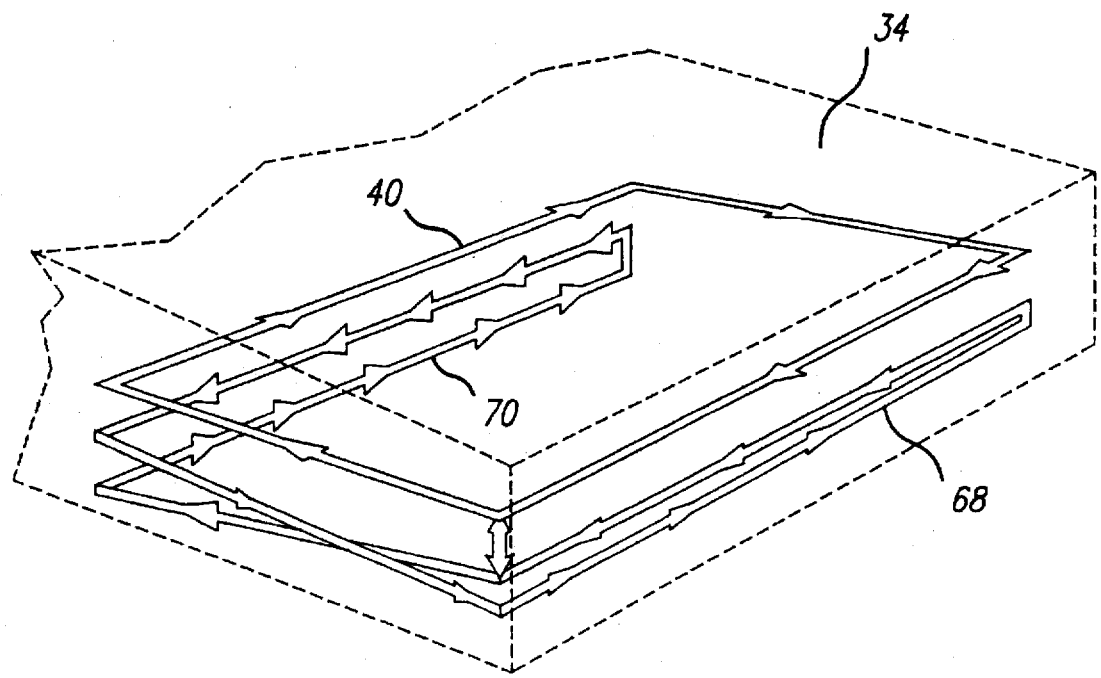
Figure 11:
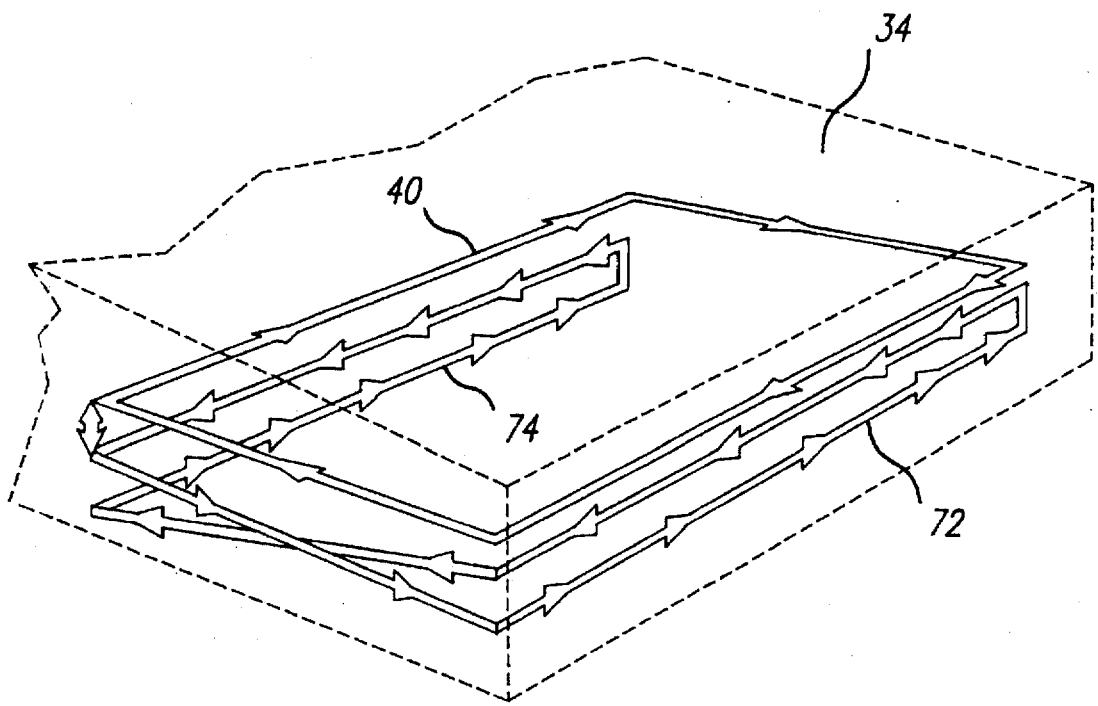
Figure 12:
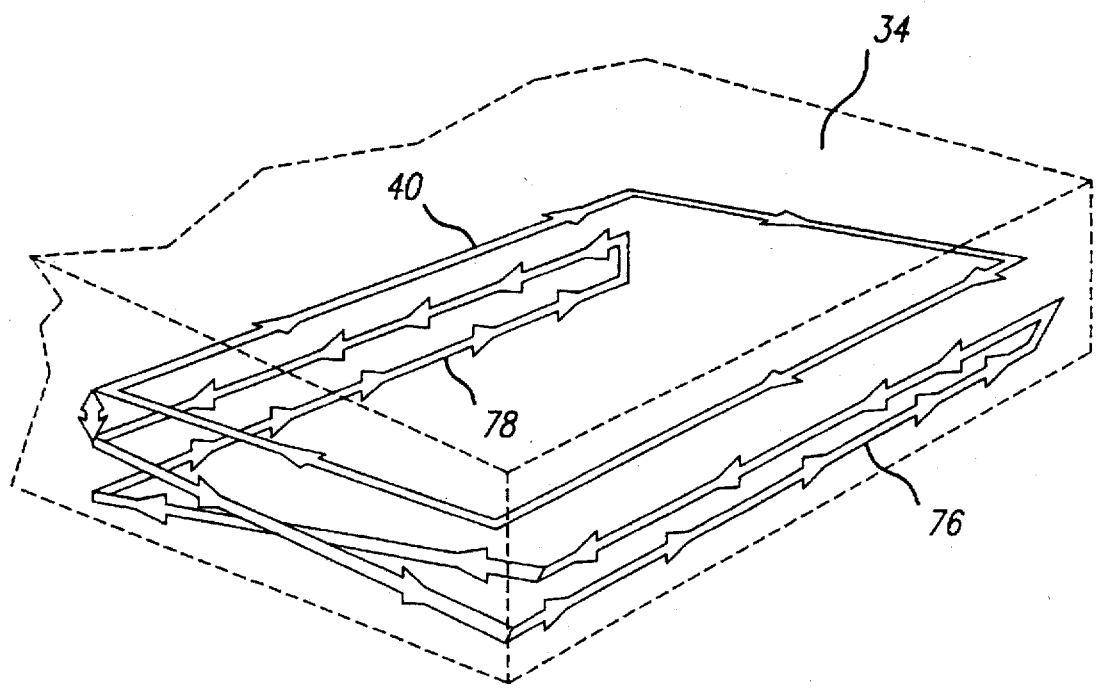

Several embodiments can also use the third option's vertically configured bottom FIG. 8 loops to produce controlled net magnetic coupling between the two bottom loops and the vehicle superconducting magnets. These embodiments can serve to cancel some of the magnetic flux in the top loop, thus reducing the number of turns required in the bottom loops. In one embodiment as shown in FIG. 10, loop A 68, and loop B 70, have dissimilar vertical heights with respect to each other, thus creating net magnetic coupling between the bottom loop and the vehicle superconducting magnet. Alternatively, as shown in FIG. 11, magnetic coupling may be created between the two bottom loops and the vehicle superconducting magnet by ensuring loop A 72, and loop B 74, parallel and with similar dimensions, are vertically displaced with respect to each other. In yet a third embodiment, as shown in FIG. 12 magnetic coupling may be created by configuring loop A 76, and loop B 78 with similar dimensions, but with one of the two loops perpendicular to the plane described by the top loop and the other offset such that it forms an angle other than 90 degrees to the top loop.

Figure 13:
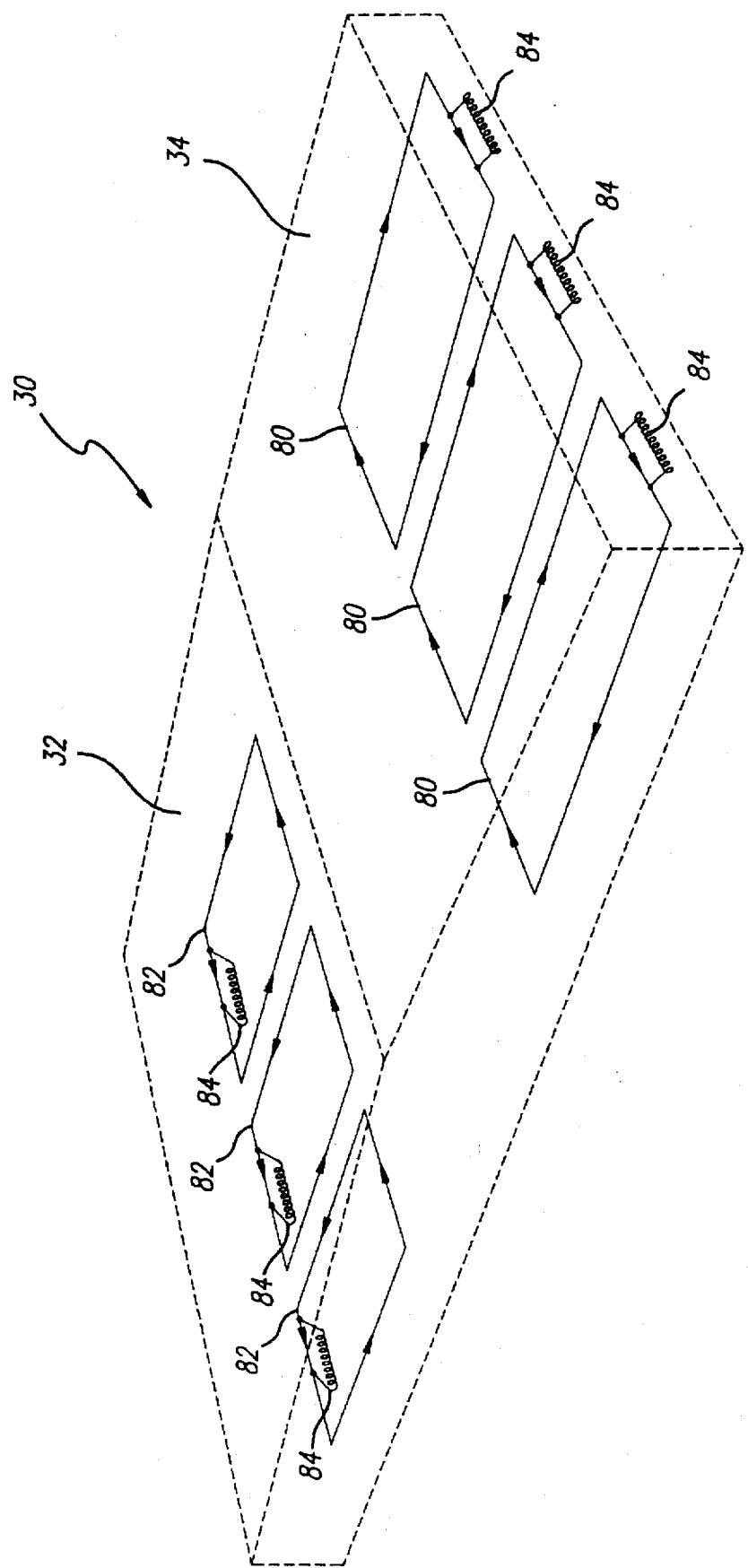

In a second preferred embodiment, shown in FIG. 13, vertical lift and stability is provided by 80 and second 82 passive magnetic induction coils mounted within the respective first 32 and second 34 sides of the substantially planar guideway. The first and second passive magnetic induction coils are coupled to separate external inductances 84 and are physically separate and discrete with respect to each other.

The current (I) in the circuit comprising a magnetic induction coil, for loop A, is determined from flux Q(A), the loop inductance L(A), and the external inductance ($L_{ex}$) as follows:

$$I(A) = \frac{Q(A)}{L(A) + L_{ex}}$$

and $$L_{ex} \gg L(A)$$

The external inductance, $L_{ex}$, can be an air core loop of wire, or a ferromagnetic or ferrite core on which the conductor wire is wound. The ferromagnetic core can be fabricated from thin strip material, wire, or powder in a bonding matrix, or other techniques used to make transformers or chokes. The external inductance can be located away from the plane of loop A and be bifilarly connected.

Figure 14:
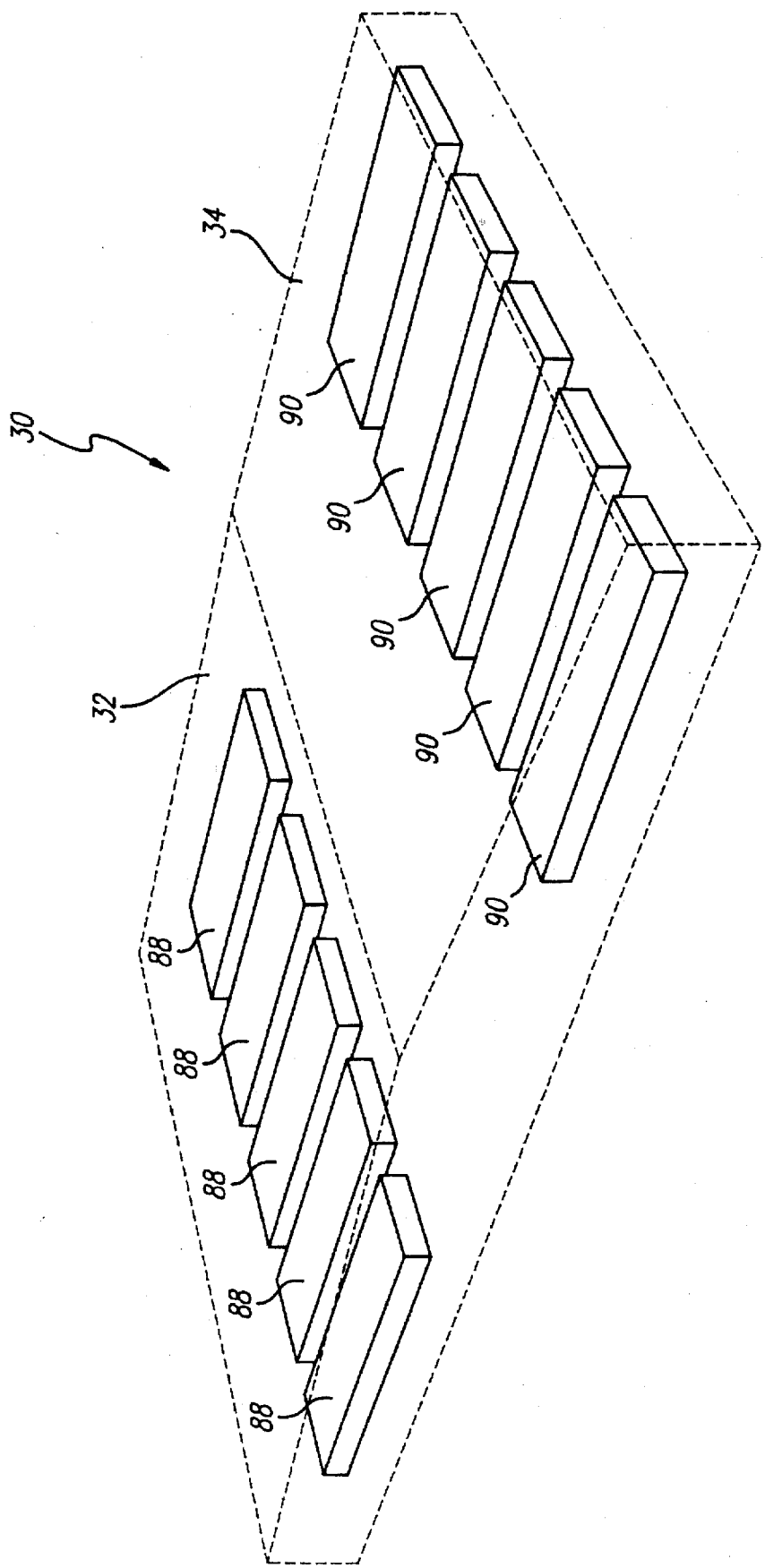

Another alternate embodiment for providing vertical lift and stability is shown in FIG. 14. This third alternative to providing vertical lift and stability comprises first 88 and second 90 short strips of conducting metal mounted within the first and second sides of the substantially planar guideway, respectively and intermittently spaced. The first and second conducting strips are physically separate and discrete with respect to each other.

Lateral stability is provided for the vehicle through a plurality of first and second passive magnetic induction lateral stability coils mounted on the respective first and second sides of the substantially planar guideway. The lateral stability coils are preferably formed of insulated stranded aluminum wire, to minimize the generation of eddy currents. The lateral stability coils are arranged such that when the vehicle superconducting magnets are not centered over the first and second lateral stability coils, the vehicle superconducting magnets force the vehicle to center itself over the first and second lateral stability coils.

Figure 15:
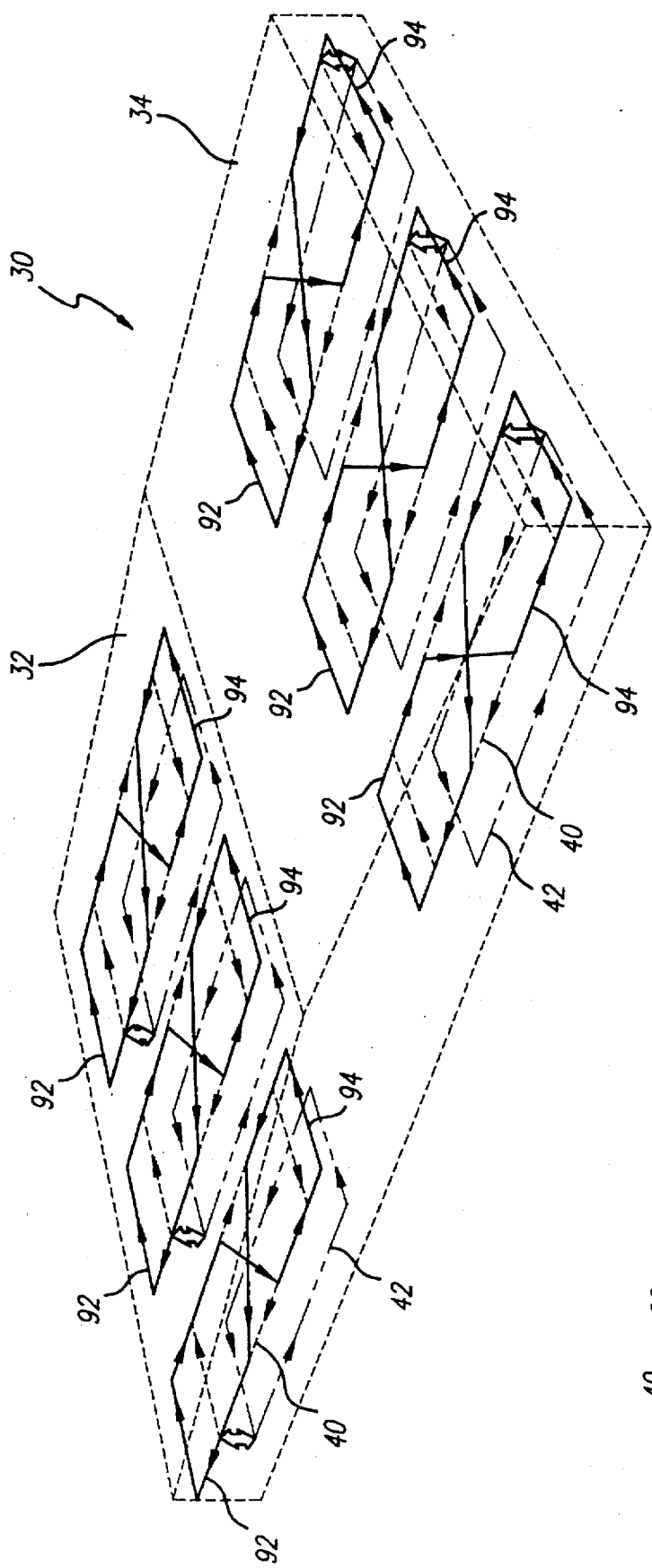
FIG. 15 is a sectional perspective schematic view showing a vertical lift and stability loop pair, and lateral stability loops for providing lateral stability and pitch, roll and yaw stability for the substantially planar guideway.
Figure 15A:
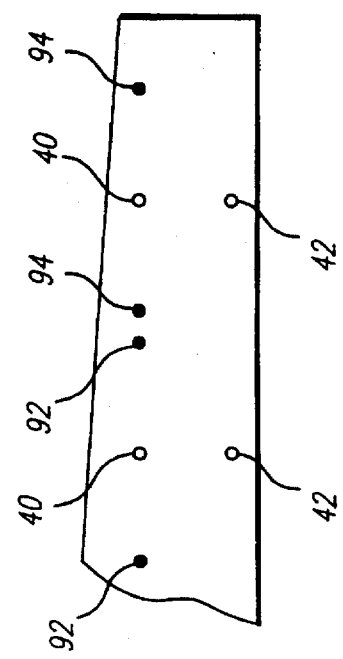
FIG. 15a is a partial cross-section through the vertical lift and stability loop pair and the lateral stability loops of FIG. 15.

In a preferred embodiment, as shown in FIG. 15 the first and second lateral stability coils comprise a FIG. 8 null flux loop circuit consisting of two tandem loops, loop A 92 and loop B 94, where loop A and loop B are wound in opposite directions, horizontally configured in a common plane and bisected by the first and second magnetically induced paths along the planar guideway.

The vertical lift means 40 and 42 are substantially as shown in FIG. 4, and are also laterally centered to provide almost neutral lateral stability. The various alternative vertical lift/stability loop arrangements can be used in place of the preferred embodiments shown in FIG. 4 and coexist with the lateral stability loops.

The vertical lift and stability loops provide pitch and roll stability as well. Pitch stability is provided because the sets of vertical lift and stability loops are separate and independent longitudinally along the substantially planar guideway. As a result if the front end of the vehicle pitches down and the back end pitches up, the magnetic restoring moment created by the interaction between the superconducting quadrupole magnets and the vertical lift and stability loops pushes the front end of the vehicle up and the pulls the back end of the vehicle down. A similar, but opposite result occurs if the front end of the vehicle pitches down.

The pairs of opposing vertical lift and stability loops inherently provide roll stability because they are located on opposite sides of the guideway. If the vehicle rolls clockwise, for example, the magnetic restoring moment is counterclockwise. The counterclockwise moment counteracts the roll and restores the vehicle to horizontal stability.

The lateral stability loops also supply yaw stability by having the lateral stability loops separate and independent along the guideway. For example, if the front end of the vehicle is displaced to the left and the back end is displaced to the right, the magnetic restoring moment pushes the front end to the right and the back end to the left. The vertical lift and lateral stability loops can be spaced in the direction of travel so that the horizontal loops lie between the vertical loops.

Figure 16:
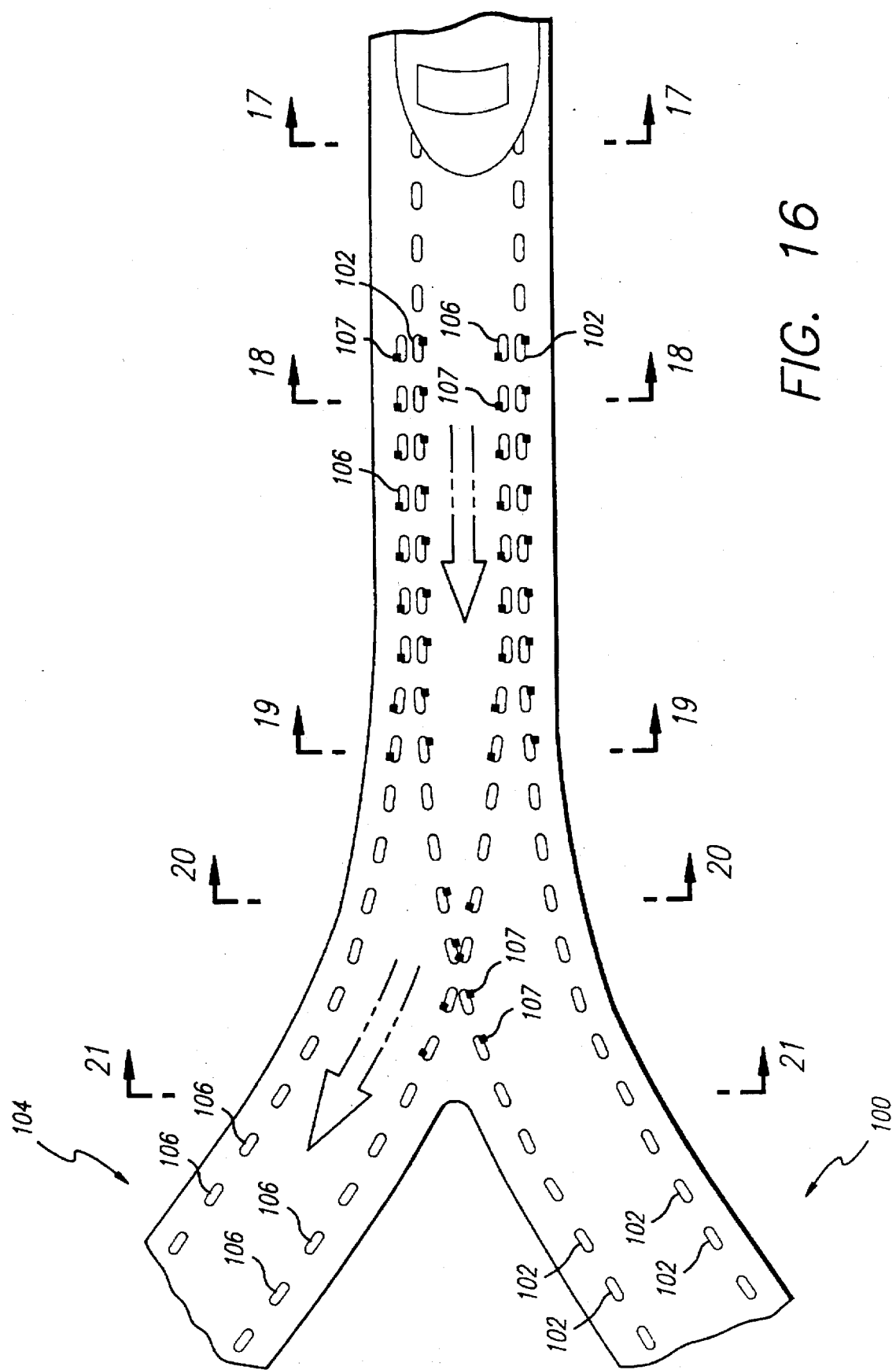
FIG. 16 is an elevational view of a switching junction between a mainline guideway and a secondary guideway illustrating the lift and stability means for each guideway and the means to switch each loop on or off.

With reference to FIG. 16, horizontal switching is accomplished between two substantially planar guideways such as a mainline guideway 100, which represents the normal flow of traffic and has a means 102 for providing lift and stability, and a secondary guideway 104 which also has a means 106 for providing lift and stability. Both the mainline guideway and the secondary guideway employ substantially similar lift and stability means as described for the substantially planar guideway. The vertical lift and stability means and the lateral stability means, however, have an additional feature in the vicinity of a switching area. The vertical lift and stability means and the lateral stability means described as passive in the embodiment for a substantially planar guideway, may be actively switched on or off by switching means 107 in the switching junction between guideways in order to compel the vehicle to travel the chosen guideway. Proximal to and within the switching junction area, the respective lift and stability means for each guideway coexist and may be switched on or off, depending on the chosen guideway. In FIG. 16 these are shown as widely separated for reasons of clarity of presentation. The switching junction is divided into zones which have different treatments for the lift and stability means to ensure the vehicle is safely transferred from the mainline guideway to the secondary guideway or in the alternative, from the secondary guideway to the mainline guideway. In FIG. 16, both the main line and switch line are shown curved. However, the main line can also be straight, for example.

Horizontal switching between guideways may not be limited to switching between substantially planar guideways. In an alternate embodiment, horizontal switching may also be accomplished in an electromagnetic induction suspension system in which the guideway captures the vehicle magnets for lift and stability, as is employed in a narrow beam guideway, for example. In systems following this approach, however, a transitional area immediately precedes and follows the substantially planar switching junction. Preferably, vehicle lift and horizontal stability gradually shifts from being provided by the narrow beam guideway, for example, towards being provided by the substantially planar guideway, preferably with matched electrodynamic parameters, until all vehicle lift and stability is provided by the substantially planar guideway. Once all vehicle lift and stability is provided by the substantially planar guideway the vehicle may enter the switching junction. The opposite is true once the vehicle has passed through a switching junction. The vehicle proceeds through a transitional area during which vehicle lift and stability gradually shifts until it is completely provided by the narrow beam guideway, for example.

With reference to FIGS. 17–21, as the control means 108 switches off the mainline lift and stability means 102 by switching means 107 and switches on the secondary lift and stability means 106, the interaction between the vehicle superconducting magnets and the secondary lift and stability means maintains vehicle height and forces the vehicle to move laterally to remain centered over the secondary guideway. The control means 108 is shown as existing on the vehicle. In an alternative embodiment, control means 108 resides in the guideway and in remotely activated. The opposite is true if the mainline guideway lift and stability means is switched on and the secondary lift and stability means is switched off. As the mainline lift and stability means and the secondary lift and stability means gradually separates into two distinct guideways, the requirement for switching is eliminated and the vehicle may proceed along the substantially planar guideway. It is noted in FIGS. 16, 17 and subsequent figures, the mainline and switchline lift and stability means are shown separated for clarity of presentation. In actuality, they will be overlapping at the point of separation, permitting a smooth transfer of forces.

Figure 17:
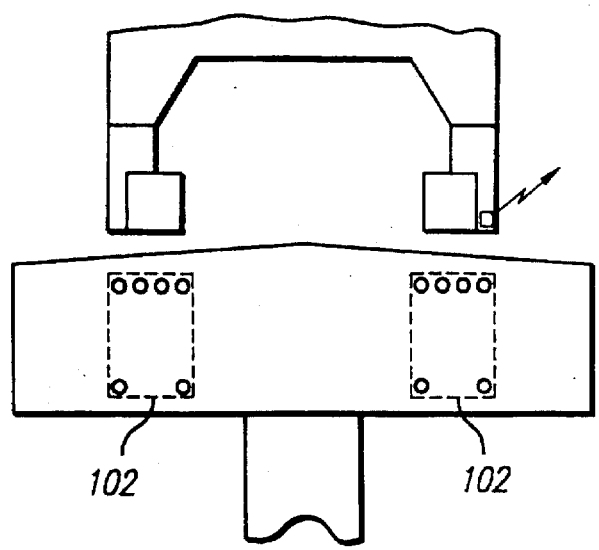
FIG. 17 is a sectional view of the vehicle and the guideway illustrating the mainline guideway and the mainline lift and stability means.
Figure 18:
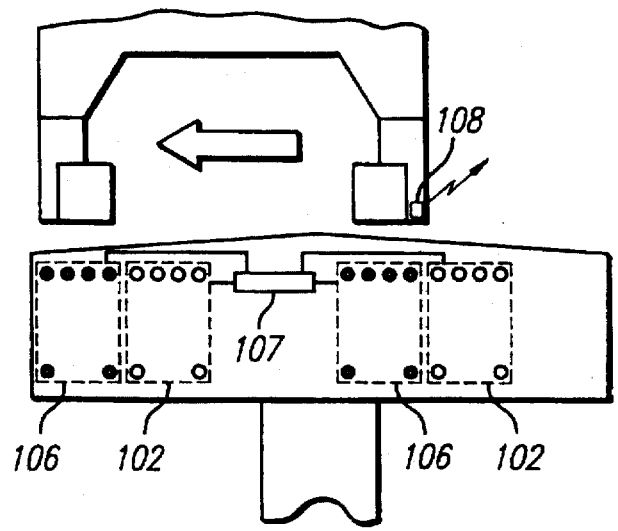
FIG. 18 is a sectional view generally taken along the line 18—18 of the switching junction of FIG. 16 illustrating switching zone one.

More specifically, assuming the vehicle is going to transfer from the mainline guideway, as shown in FIG. 17, to the secondary guideway, the vehicle progresses along the mainline guideway and enters zone one in the switching area, as shown in FIG. 18, the start of the junction of the mainline and secondary guideways. Zone one includes the region of small separation between the mainline lift and stability means and the secondary lift and stability means. Within zone one, in this preferred embodiment, the vehicle may attain a horizontal separation of approximately 5 inches from the mainline lift and stability means while switching to the secondary guideway over 220 feet at 300 m.p.h. in approximately 0.5 seconds, generating a horizontal force of only 0.1 g against the vehicle and its contents. The secondary guideway lift and stability means provides lift and horizontal stability for the vehicle.

In a preferred embodiment, switching between the mainline lift and stability means and the secondary lift and stability means may preferably be achieved in zone one by control means 108 switching off all mainline lift and stability loops while simultaneously switching on all secondary guideway lift and stability means as shown in FIG. 18.

In another embodiment, switching in zone one may be achieved by control means switching on secondary lift and stability means while the mainline lift and stability means remain active. This embodiment results in the vehicle superconducting magnets undergoing simultaneous force from both sets of lift and stability means. This causes the vehicle to average the forces and develop an intermediate trajectory in the desired turning direction. This alternative has the benefit of eliminating the switches from the mainline lift and stability means in zone one. If the control means switch to shunt the vehicle to the secondary line were not to operate, the vehicle would continue on the mainline.

In another embodiment, to augment stability while switching, the lift and stability means within the switching area may include a series of closely spaced loops such as aluminum strips to automatically provide stable lift independent of horizontal position.

Figure 19:
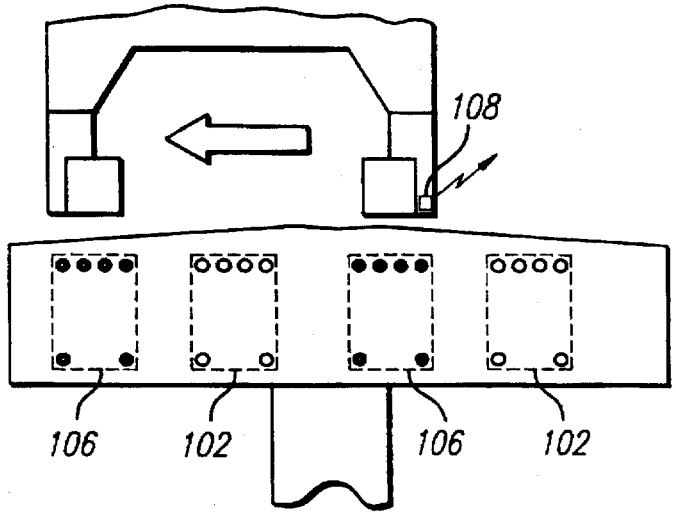
FIG. 19 is a sectional view generally taken along the line 19—19 of the switching junction of FIG. 16 illustrating switching zone three.

The vehicle next proceeds through the zone two area of intermediate horizontal displacement as shown in FIG. 19. In zone two the vehicle may move approximately 20 inches laterally, over 220 feet at 300 m.p.h. in approximately 0.5 seconds. Again, assuming the vehicle is turning onto the secondary guideway, consistent with the actions in zone one, in a preferred embodiment continued separation is achieved by switching on the secondary lift and stability means and switching off the mainline lift and stability means. As a result the secondary guideway lift and stability means provides the sole lift and stability for the vehicle in zone two.

The vehicle next proceeds through the zone three area of large horizontal displacement. Within zone three the distance between the mainline lift and stability means and the secondary lift and stability means is great enough such that there is no cross talk and no switching may be required of either lift and stability means. This preferably allows the installation of purely passive, unswitched, mainline and secondary lift and stability means to save cost and complexity. In an alternative embodiment, assuming the vehicle is turning onto the secondary guideway, switchable mainline and secondary lift and stability means may be implemented to switch on the secondary lift and stability means and switch off the mainline lift and stability means.

Figure 20:
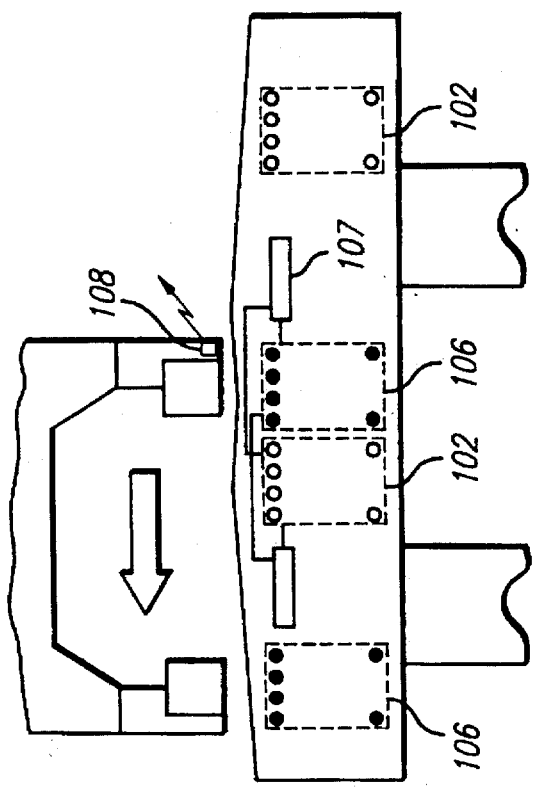
FIG. 20 is a sectional view generally taken along the line 20—20 of the switching junction of FIG. 16 illustrating switching zone four.

The vehicle next proceeds through the zone four area of large horizontal displacement as shown in FIG. 20. A mainline vehicle with superconducting magnets on first and second sides travels longitudinally along the mainline of the substantially planar guideway on first, and Second, mainline lift and stability means. As the vehicle continues to transition to a secondary guideway within zone four, switchable lift and stability means may be required as the vehicle's first side superconducting magnets crosses the second, or opposing, mainline lift and stability means. To counter this concern, preferably the second side of the mainline lift and stability means is switched off. The first side of the mainline lift and stability means do not require switching because the vehicle superconducting magnets switching the vehicle are completely clear of side one of the mainline guideway, and of side two of the switching guideway. In an alternative embodiment, in zone four, horizontal restoring forces of the mainline and secondary guideway lift and stability means could be twice as strong on the sides remote from the crossover, and zero on the side of the mainline and secondary guideway which crosses over, that is, where 102 and 106 are immediately adjacent in FIG. 20. The electrodynamic behavior is substantially unchanged and this system requires no horizontal stability switching in zone 4.

Figure 21:
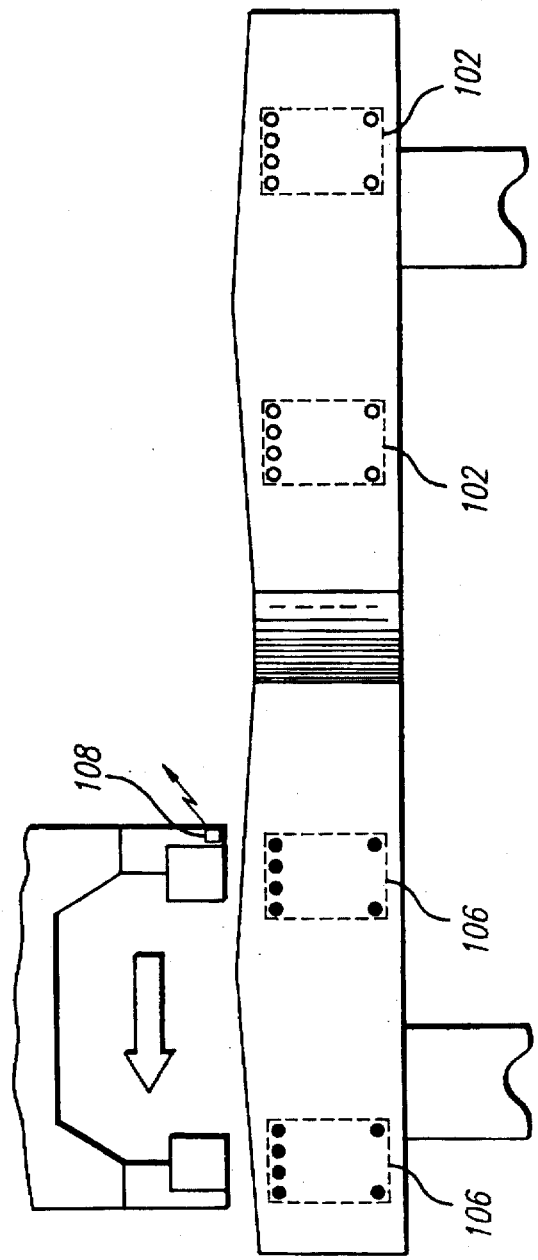
FIG. 21 is a sectional view generally taken along the line 21—21 of the switching junction of FIG. 16 illustrating switching zone five.

In the final switching zone, as shown in FIG. 21, the mainline lift and stability means and the secondary lift and stability means preferably separate into two distinct guideways. In zone five the requirement for switching is eliminated and the vehicle may proceed along the secondary guideway.

Transitioning a vehicle between guideways at speeds up to 300 m.p.h. requires reliable, high speed switching. It is highly desirable that any failure mode will result in the vehicle continuing stably on the mainline. This reliability may preferably be achieved by employing switches to switch the lift and stability means to an open or closed condition. Alternatively, lift and stability means may be switched through inductive activation.

Solid state back-to-back switches can with great reliability switch on and off, or open and close, the loops of the lift and stability means. Preferably the same triggering signal which opens the mainline lift and stability means will close the secondary guideway lift and stability means. The opposite is also true. The activators themselves may be attached to both mainline and switchline lift and stability elements, so that the act of opening one line automatically closes the other line. Alternatively, each solid state switch can for greater reliability be replaced by four switches, two in series and two in parallel. In the unlikely event of a failure of a single switch, either in the open or closed condition, the parallel and series set of four switches still permits safe and reliable activation to achieve the desired switched condition.

In another embodiment electromechanical ganged switches activated by signal may be employed. For increased safety, the normal and failed conditions for the electromechanical switches are preferably in the mainline guideway condition. Upon receiving a signal to switch, a solenoidal current or equivalent force is brought to bear which pulls a mechanical shaft into the switch position. A spring strongly restores the shaft to the normal position when the current is turned off. Mechanical ganging of all switches in zone one and zone two can be accomplished by running a single turn from each lift and stability loop. This requires a bipolar pair up to 220 feet in length. Zone three and five require no switches. The zone four switches can also be ganged with the zone one and two switches.

An alternative to ganged switches is a common activation signal mechanism which senses the correct response of all switches or else returns all to the normal state.

Another mechanism for switching is to replace a circuit closing or breaking switch with a saturable reactor or transformer in series with a lift or stability loop. By increasing the inductance of the lift and stability means by a factor of ten or more, the loop current is so reduced as to effectively be shut off. This requires a series inductor in the lift and stability loops, similar to that shown in FIG. 13. However, in the present case, an additional transformer winding added to the ferromagnetic core is used to either saturate or unsaturate the inductor, thereby changing its value.

In another embodiment the lift and stability means can be switched by inductively coupling flux from a programmed generator to cancel the primary current in the lift and stability means generated by the interaction with the vehicle superconducting magnets. This can be synchronized from a pickup on the guideway upstream of the switch. This permits the secondary lift and stability means, or the guideway onto which the vehicle is switching, to control the vehicle.

In another embodiment the lift and stability means can be switched by using a levitation loop field sensor and feedback to inductively cancel the lift and stability means current.

In another embodiment the lift and stability means can be switched by sensing the location of the vehicle and controlling it actively with currents in the guideway. These currents are A.C. synchronized with the passage overhead of the vehicle superconducting magnets.

Transitioning a vehicle between guideways at speeds up to 300 m.p.h. preferably requires centralized control to ensure both passenger safety and economical use of resources. In a preferred embodiment, vehicle progress along the substantially planar guideway is monitored by a regional command center. Commands to change vehicle characteristics such as direction or speed are preferably generated from the regional center. Commands related to switching between mainline and secondary guideways can be transmitted to the subject vehicle, which employs electronic activators to respond to the commands. In an alternate embodiment, the control means can be autonomous whereby the on-board vehicle operator can direct speed and direction of the vehicle through the vehicle electronic activators. In another embodiment, commands can emanate from the regional command center and directly control track loop switching, thereby directly controlling the vehicle.

The present invention provides for an electromagnetic induction suspension and stabilization system which takes advantage of the electromagnetic forces between vehicle magnets and guideway to operate on a substantially planar guideway. The present invention also provides a system which allows electronic horizontal switching between guideways at high speed. As a result, a vehicle operating on a substantially planar guideway may horizontally switch between guideways without cumbersome mechanical switching of guideway elements or vertical displacement of the vehicle.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An electromagnetic induction suspension and stabilization system for a vehicle, said system comprising:

a guideway for a vehicle, said guideway having first and second sides;

vertical lift and stability means for providing vertical lift stability to the vehicle on said guideway, said vertical lift and stability means comprising a plurality of first and second pairs of passive magnetic induction coils arranged as electrically independent first and second pairs of null flux loop circuits mounted on said first and second sides of said guideway, respectively, each successive pair of first and second null flux loop circuits extending longitudinally to create a first and second magnetically induced path along said guideway; and said first and second pairs of null flux loop circuits comprising parallel top and bottom horizontal loops, electrically connected in series, wound in opposite directions, said top loop comprised of fewer turns of wire than said bottom loop and superimposed over the bottom loop, whereby when magnets of said vehicle are in proximity to said first and second pairs of null flux loop circuits the upwards magnetic force of said first and second null flux loop circuits equals the weight of the vehicle so as to maintain the vehicle magnets at an equilibrium level above said first and second pairs of null flux loop circuits.

2. An electromagnetic induction suspension and stabilization system for a vehicle, said system comprising:

a guideway for a vehicle, said guideway having first and second sides;

vertical lift and stability means for providing vertical lift stability to the vehicle on said guideway, said vertical lift and stability means comprising a plurality of first and second pairs of passive magnetic induction coils arranged as electrically independent first and second pairs of null flux loop circuits mounted on said first and second sides of said guideway, respectively, each successive pair of first and second null flux loop circuits extending longitudinally to create a first and second magnetically induced path along said guideway; and said null flux loop circuits comprising parallel, top and bottom horizontal loops, electrically connected in series; said bottom loop comprising a FIG. 8 loop consisting of two tandem loops, loop A and loop B, said loop A and loop B wound in opposite directions, horizontally configured in a common plane and bisected by a first and second magnetically induced path of the vehicle.

3. The electromagnetic induction suspension and stabilization system of claim 2 wherein said loop A and loop B have a different number of turns of wire with respect to each other.

4. The electromagnetic induction suspension and stabilization system of claim 2 wherein said loop A and loop B have different lateral widths with respect to each other.

5. The electromagnetic induction suspension and stabilization system of claim 2 wherein said loop A and loop B are parallel and horizontally displaced with respect to each other thereby creating a net magnetic flux.

6. An electromagnetic induction suspension and stabilization system for a vehicle, said system comprising:

a guideway for a vehicle, said guideway having first and second sides;

vertical lift and stability means for providing vertical lift stability to the vehicle on said guideway, said vertical lift and stability means comprising a plurality of first and second pairs of passive magnetic induction coils arranged as electrically independent first and second pairs of null flux loop circuits mounted on said first and second sides of said guideway, respectively, each successive pair of first and second null flux loop circuits extending longitudinally to create a first and second magnetically induced path along said guideway; and said first and second pairs of null flux loop circuits comprising a top loop and two bottom loops, said bottom loops comprised of loop A and loop B, electrically connected in series, perpendicular to the plane created by the top loop and laterally displaced in tandem to each other.

7. The electromagnetic induction suspension and stabilization system of claim 6 wherein said loop A and loop B are parallel and have different vertical heights with respect to each other.

8. The electromagnetic induction suspension and stabilization system of claim 6 wherein said loop A and loop B are parallel, have substantially the same dimensions and are vertically displaced with respect to each other.

9. The electromagnetic induction suspension and stabilization system of claim 6 wherein said loop A and loop B have substantially the same dimensions, but only one of said loop A or loop B is perpendicular to the plane described by said top loop, the other loop forming an angle other than 90 degrees to the top loop whereby creating a net magnetic flux.

10. An electromagnetic induction suspension and stabilization system for a vehicle, said system comprising:

a guideway for a vehicle, said guideway having first and second sides;

vertical lift and stability means for providing vertical lift stability to the vehicle on said guideway, said vertical lift and stability means comprising a plurality of first and second pairs of passive magnetic induction coils arranged as electrically independent first and second pairs of null flux loop circuits mounted on said first and second sides of said guideway, respectively, each successive pair of first and second null flux loop circuits extending longitudinally to create a first and second magnetically induced path along said guideway;

said first and second pairs of null flux loop circuits comprising a top loop and a bottom loop;

lateral stability means for providing lateral stabilization and centering of the vehicle with respect to said guideway, said lateral stability means comprising a plurality of first and second passive magnetic induction lateral stability coils mounted on the first and second sides of said guideway, respectively, and arranged such that when magnets of the vehicle are in proximity to said first and second lateral stability coils and are not spaced laterally equidistant from said first and second lateral stability coils on the first and second sides of the guideway, a lateral restoring force of the vehicle magnets forces the vehicle magnets to center themselves equidistant from said first and second lateral stability coils;

said first and second lateral stability coils each comprising a FIG. 8 null flux loop circuit consisting of two tandem loops, loop A and loop B, where loop A and loop B are wound in opposite directions, horizontally configured in a common plane and bisected by a first and second magnetically induced path of the vehicle magnets along said guideway;

wherein said first and second lateral stability coils are laterally centered on the vertical lift and stability means; and wherein said first and second lateral stability coils comprise wire.

11. An electromagnetic induction suspension and stabilization system for a vehicle, said suspension and stabilization system comprising:

a vehicle guideway having first and second sides, said vehicle guideway including a mainline guideway for providing lift and stability and a secondary guideway for providing lift and stability, said vehicle guideway being adapted for horizontal switching of the vehicle between said mainline guideway and said secondary guideway;

mainline vertical lift and stability means for providing vertical lift stability to the vehicle on the mainline guideway, said mainline vertical lift and stability means comprising a plurality of first and second pairs of passive magnetic induction coils, arranged as electrically independent first and second pairs of null flux loop circuits, mounted on said first and second sides of said vehicle guideway, respectively, each successive pair of first and second null flux loop circuits extending longitudinally to create a first and second magnetically induced path of the vehicle along said vehicle guideway, said first and second pairs of null flux loop circuits comprising a top loop and a bottom loop; and mainline lateral stability means for providing lateral stabilization and centering of the vehicle with respect to said mainline guideway;

said first and second pairs of null flux loop circuits comprising parallel top and bottom horizontal loops, electrically connected in series, wound in opposite directions, said top loop comprised of fewer turns of wire than said bottom loop and superimposed over the bottom loop, whereby when magnets of the vehicle are in proximity to said first and second pairs of null flux loop circuits the upwards magnetic force of said first and second null flux loop circuits equals the weight of the vehicle so as to maintain the vehicle magnets at an equilibrium level above said first and second pairs of null flux loop circuits.

12. An electromagnetic induction suspension and stabilization system for a vehicle, said suspension and stabilization system comprising:

a vehicle guideway having first and second sides, said vehicle guideway including a mainline guideway for providing lift and stability and a secondary guideway for providing lift and stability, said vehicle guideway being adapted for horizontal switching of the vehicle between said mainline guideway and said secondary guideway;

mainline vertical lift and stability means for providing vertical lift stability to the vehicle on the mainline guideway, said mainline vertical lift and stability means comprising a plurality of first and second pairs of passive magnetic induction coils, arranged as electrically independent first and second pairs of null flux loop circuits, mounted on said first and second sides of said vehicle guideway, respectively, each successive pair of first and second null flux loop circuits extending longitudinally to create a first and second magnetically induced path of the vehicle along said vehicle guideway, said first and second pairs of null flux loop circuits comprising a top loop and a bottom loop; and mainline lateral stability means for providing lateral stabilization and centering of the vehicle with respect to said mainline guideway;

said null flux loop circuits comprising parallel, top and bottom horizontal loops, electrically connected in series, said bottom loop comprising a FIG. 8 loop consisting of two tandem loops, loop A and loop B, said loop A and loop B wound in opposite directions, horizontally configured in a common plane and bisected by the first and second magnetically induced path of the vehicle.

13. The electromagnetic induction suspension and stabilization system of claim 12 wherein said loop A and loop B have a different number of turns of wire with respect to each other.

14. The electromagnetic induction suspension and stabilization system of claim 12 wherein said loop A and loop B have different lateral widths with respect to each other.

15. The electromagnetic induction suspension and stabilization system of claim 12 wherein said loop A and loop B are parallel and horizontally displaced with respect to each other.

16. An electromagnetic induction suspension and stabilization system for a vehicle, said suspension and stabilization system comprising:

a vehicle guideway having first and second sides, said vehicle guideway including a mainline guideway for providing lift and stability and a secondary guideway for providing lift and stability, said vehicle guideway being adapted for horizontal switching of the vehicle between said mainline guideway and said secondary guideway;

mainline vertical lift and stability means for providing vertical lift stability to the vehicle on the mainline guideway, said mainline vertical lift and stability means comprising a plurality of first and second pairs of passive magnetic induction coils, arranged as electrically independent first and second pairs of null flux loop circuits, mounted on said first and second sides of said vehicle guideway, respectively, each successive pair of first and second null flux loop circuits extending longitudinally to create a first and second magnetically induced path of the vehicle along said vehicle guideway, said first and second pairs of null flux loop circuits comprising a top loop and a bottom loop; and mainline lateral stability means for providing lateral stabilization and centering of the vehicle with respect to said mainline guideway;

said first and second pairs of null flux loop circuits comprising a top loop and two bottom loops, said bottom loops comprised of loop A and loop B, electrically connected in series, perpendicular to the plane created by the top loop and laterally displaced in tandem to each other.

17. The electromagnetic induction suspension and stabilization system of claim 16 wherein said loop A and loop B are parallel and have different vertical heights with respect to each other whereby creating a net magnetic flux.

18. The electromagnetic induction suspension and stabilization system of claim 16 wherein said loop A and loop B are parallel, have substantially the same dimensions and are vertically displaced with respect to each other, thereby creating a net magnetic flux.

19. The electromagnetic induction suspension and stabilization system of claim 16 wherein said loop A and loop B have substantially the same dimensions, but only one of said loop A or loop B is perpendicular to the plane described by said top loop, the other loop forming an angle other than 90 degrees to the top loop, thereby creating a net magnetic flux.

20. An electromagnetic induction suspension and stabilization system for a vehicle, said suspension and stabilization system comprising a vehicle guideway having first and second sides, said vehicle guideway including a mainline guideway for providing lift and stability and a secondary guideway for providing lift and stability, said vehicle guideway being adapted for horizontal switching of the vehicle between said mainline guideway and said secondary guideway;

mainline vertical lift and stability means for providing vertical lift stability to the vehicle on the mainline guideway, said mainline vertical lift and stability means comprising a plurality of first and second pairs of passive magnetic induction coils, arranged as electrically independent first and second pairs of null flux loop circuits, mounted on said first and second sides of said vehicle guideway, respectively, each successive pair of first and second null flux loop circuits extending longitudinally to create a first and second magnetically induced path of the vehicle along said vehicle guideway, said first and second pairs of null flux loop circuits comprising a top loop and a bottom loop;

mainline lateral stability means for providing lateral stabilization and centering of the vehicle with respect to said mainline guideway;

said mainline lateral stability means comprising a plurality of first and second passive magnetic induction lateral stability coils mounted on the first and second sides of said guideway, respectively, and arranged such that when magnets of the vehicle are in proximity to said first and second lateral stability coils and are not spaced laterally equidistant from the first and second lateral stability coils on the first and second sides of the guideway, a lateral restoring force of the vehicle magnets forces the vehicle magnets to center themselves equidistant from said first and second lateral stability coils;

said first and second lateral stability coils each comprising a FIG. 8 null flux loop circuit consisting of two tandem loops, loop A and loop B, where loop A and loop B are wound in opposite directions, horizontally configured in a common plane and bisected by the first and second magnetically induced path of the vehicle along said guideway;

wherein said first and second lateral stability coils are laterally centered on said vertical lift and stability means; and wherein said first and second lateral stability coils comprise wire.

21. An electromagnetic induction suspension and stabilization system for a vehicle, said suspension and stabilization system comprising:

a vehicle guideway having first and second sides, said vehicle guideway including a mainline guideway for providing lift and stability and a secondary guideway for providing lift and stability, said vehicle guideway being adapted for horizontal switching of the vehicle between said mainline guideway and said secondary guideway;

mainline vertical lift and stability means for providing vertical lift stability to the vehicle on the mainline guideway, said mainline vertical lift and stability means comprising a plurality of first and second pairs of passive magnetic induction coils, arranged as electrically independent first and second pairs of null flux loop circuits, mounted on said first and second sides of said vehicle guideway, respectively, each successive pair of first and second null flux loop circuits extending longitudinally to create a first and second magnetically induced path of the vehicle along said vehicle guideway, said first and second pairs of null flux loop circuits comprising a top loop and a bottom loop;

mainline lateral stability means for providing lateral stabilization and centering of the vehicle with respect to said mainline guideway;

horizontal switching means for switching the path of the vehicle between said mainline guideway;

said secondary guideway further comprising:

secondary vertical lift and stability means for providing vertical lift, pitch and roll stability to the vehicle on the secondary guideway;

secondary lateral stability means for providing lateral stabilization and centering of the vehicle with respect to said secondary guideway;

control means for controlling said horizontal switching means;

said secondary lateral stability means comprising first and second passive magnetic induction lateral stability coils mounted on first and second sides of said vehicle guideway, respectively, defining the secondary path of the vehicle;

the first and second passive magnetic induction lateral stability coils comprising a FIG. 8 null flux loop circuit consisting of two tandem loops, loop A and loop B, where loop A and loop B are wound with wire in opposite directions, horizontally configured in a common plane and bisected by the secondary guideway; and wherein said first and second passive magnetic induction lateral stability coils are laterally centered on the secondary vertical lift and stability means.

* * * * *

UNITED STATES PATENT AND TRADEMARK OFFICE
CERTIFICATE OF CORRECTION

PATENT NO. : 5,669,310
DATED : Sep. 23, 1997
INVENTOR(S) : James R. Powell, Gordon T. Danby, John Morena It is certified that error appears in the above-identified patent and that said Letters Patent is hereby corrected as shown below:

Column 3, Lines 48,50,55 and 59, Change "FIG. 8", To read --figure 8--.
Column 4, Lines 14 and 55, Change "FIG. 8", To read --figure 8--.
Column 8, Lines 51 and 57, Change "FIG. 8", To read --figure 8--.
Column 9, Lines 1,8,14,16 and 18, Change "FIG. 8", To read --figure 8--.
Column 10, Line 39, Change "FIG. 8", To read --figure 8--.
Column 15, Claim 2, Line 51, Change "FIG. 8", To read --figure 8--.
Column 16, Claim 10, Line 67, Change "FIG. 8", To read --figure 8--.
Column 18, Claim 12, Line 11, Change "FIG. 8", To read --figure 8--.
Column 19, Claim 20, Line 49, Change "FIG. 8", To read --figure 8--.
Column 20, Claim 21, Line 47, Change "FIG. 8", To read --figure 8--.

Signed and Sealed this

Tenth Day of February, 1998

*Attest:*

BRUCE LEHMAN

*Attesting Officer*   *Commissioner of Patents and Trademarks*